United States Patent
Volyn et al.

(10) Patent No.: US 12,511,846 B2
(45) Date of Patent: Dec. 30, 2025

(54) XR DEVICE-BASED TOOL FOR CROSS-PLATFORM CONTENT CREATION AND DISPLAY

(71) Applicant: simpleAR, Inc., Irvine, CA (US)

(72) Inventors: Julian Volyn, Long Valley, NJ (US); Michael Davis, Yorba Linda, CA (US); TJ Southard, Newport, NC (US); Phillip Do, Chandler, AZ (US); Josh Zavaleta, Aliso Viejo, CA (US); James Williams, Anaheim, CA (US); Marlo Brooke, Newport Coast, CA (US); Scott Toppel, Virginia Beach, VA (US)

(73) Assignee: simpleAR, Inc., Irvine, CA (US)

(*) Notice: Subject to any disclaimer, the term of this patent is extended or adjusted under 35 U.S.C. 154(b) by 0 days.

(21) Appl. No.: 18/783,227

(22) Filed: Jul. 24, 2024

(65) Prior Publication Data

US 2025/0037388 A1    Jan. 30, 2025

Related U.S. Application Data

(60) Provisional application No. 63/515,307, filed on Jul. 24, 2023.

(51) Int. Cl.
| | | |
|---|---|---|
| G06F 3/04815 | (2022.01) | |
| G06F 9/451 | (2018.01) | |
| G06T 19/00 | (2011.01) | |

(52) U.S. Cl.
CPC ........ G06T 19/006 (2013.01); G06F 3/04815 (2013.01); G06F 9/452 (2018.02);
(Continued)

(58) Field of Classification Search
CPC ... G06F 9/452; G06T 19/006; G06T 2200/24; G06T 2210/12; G06T 2210/21
See application file for complete search history.

(56) References Cited

U.S. PATENT DOCUMENTS

| | | | |
|---|---|---|---|
| 11,232,643 B1 | 1/2022 | Stevens et al. | |
| 2013/0044128 A1* | 2/2013 | Liu | G02B 27/017 345/633 |

(Continued)

FOREIGN PATENT DOCUMENTS

| | | |
|---|---|---|
| CN | 111612913 A | 9/2020 |
| CN | 114860215 A | 8/2022 |

OTHER PUBLICATIONS

International Search Report and Written Opinion, dated Nov. 1, 2024, for International Patent Application No. PCT/US2024/039399. (7 pages).

*Primary Examiner* — Tamara T Kyle
*Assistant Examiner* — William Wong
(74) *Attorney, Agent, or Firm* — Seed Intellectual Property Law Group LLP

(57) ABSTRACT

A facility for providing an XR device-based tool for cross-platform content creation and display is disclosed. The facility causes a definition of a mixed reality (MR) procedure to be presented by an editing MR device in a virtual application window. Input is received via the editing MR device. The facility interprets the received input as one or more editing actions performed with respect to the MR procedure definition and alters the MR procedure definition accordingly. The facility creates a device-independent representation of the MR procedure based on the altered MR procedure definition.

20 Claims, 17 Drawing Sheets

(52) U.S. Cl.
CPC ...... *G06T 2200/24* (2013.01); *G06T 2210/12* (2013.01); *G06T 2210/21* (2013.01)

(56) References Cited

U.S. PATENT DOCUMENTS

| | | |
|---|---|---|
| 2018/0130243 A1 | 5/2018 | Kim et al. |
| 2018/0350145 A1 | 12/2018 | Byl et al. |
| 2019/0370544 A1* | 12/2019 | Wright, Jr. ................ G06T 7/20 |
| 2022/0139254 A1* | 5/2022 | Ramani ................ G06V 10/25 |
| | | 434/401 |
| 2022/0366641 A1* | 11/2022 | Yip ....................... G06T 19/006 |
| 2023/0154110 A1* | 5/2023 | Stout ...................... G06T 17/20 |
| | | 345/156 |
| 2023/0343043 A1* | 10/2023 | Greunke ............... G06T 7/0002 |

\* cited by examiner

XR DEVICE-BASED TOOL FOR CROSS-PLATFORM CONTENT CREATION AND DISPLAY

CROSS-REFERENCE TO RELATED APPLICATIONS

This Application claims the benefit of U.S. Provisional Application No. 63/515,307, filed Jul. 24, 2023, and entitled "XR WEARABLE DEVICE-BASED AR CONTENT CREATION, PUBLISHING AND VIEWING TOOL," which is hereby incorporated by reference in its entirety.

This Application is related to U.S. application Ser. No. 18/583,357, filed Feb. 21, 2024, and entitled "DEVELOPING MIXED REALITY APPLICATIONS IN CONNECTION WITH A VIRTUAL DEVELOPMENT ENVIRONMENT," which is hereby incorporated by reference in its entirety.

This Application is related to U.S. application Ser. No. 18/583,362, filed Feb. 21, 2024, and entitled "SERIALIZING AND DESERIALIZING MIXED REALITY EXPERIENCES OR PORTIONS THEREOF," which is hereby incorporated by reference in its entirety.

In cases where the present application conflicts with a document incorporated by reference, the present application controls.

BACKGROUND

Augmented reality (i.e., "AR"), mixed reality (i.e., "MR"), and virtual reality (i.e., "VR"), collectively, "XR" can be used to provide users with interactive experiences. Augmented reality generally refers to experiences wherein virtual artifacts are overlaid onto real-world scenes. Mixed reality generally refers to experiences wherein virtual artifacts are displayed and can interact with real-world objects. Virtual reality generally refers to experiences wherein the scene is entirely virtual.

Various XR devices may have different capabilities. For example, a VR device may not be capable of displaying MR experiences because, for example, it lacks a camera by which to obtain information regarding a real-world setting.

DETAILED DESCRIPTION

Figure 1:
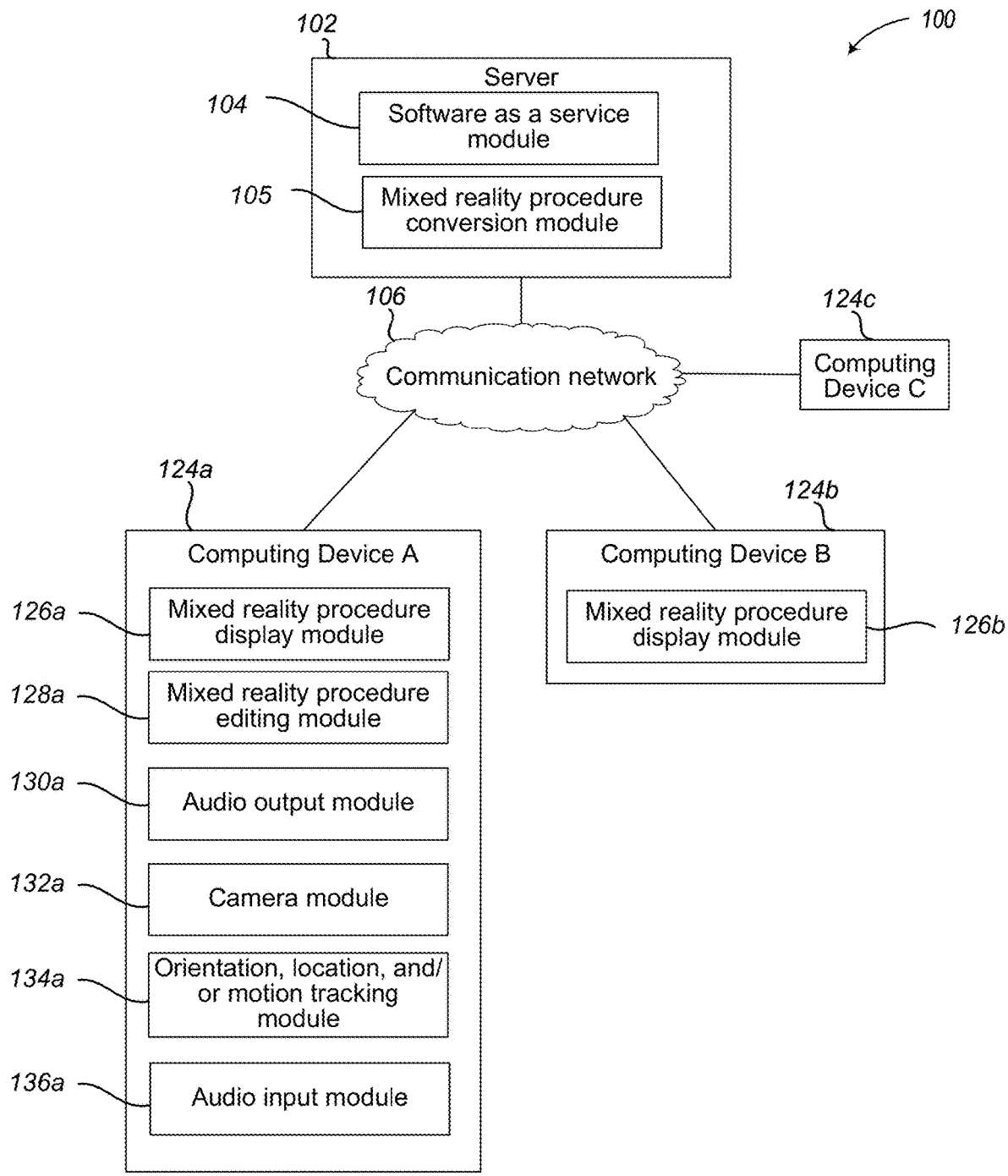
FIG. 1 is a network diagram showing an environment in which the facility operates.

XR devices vary widely in their capabilities and use-cases, ranging from inexpensive novelty devices to expensive professional-grade devices capable of rendering entirely virtual environments.

A proprietary development application is available for many XR devices to develop applications for the XR device. To develop applications for the XR device, a user wears the XR device and interacts with the development application. For example, the user may manipulate various objects to appear in an XR application using native gestures of the XR device.

The inventors have recognized that applications created in this way are often not cross-compatible with other XR devices. Thus, an XR application developed using a first type of XR device (e.g., one of Hololens®, Oculus®, Magic Leap®, etc.) typically cannot be run using other XR devices. This prevents widespread adoption of XR applications because each XR application can often only be run by a small subset of XR devices or XR platforms. This also disincentivizes developers from developing XR applications in general because the number of devices on which any one application can be run is a small fraction of the total XR devices. The fragmented XR development ecosystem is a disadvantage of conventional XR development that hinders development and adoption of XR applications.

The inventors have recognized another disadvantage of conventional XR application development is that a same XR application cannot typically be developed, modified, or displayed using different XR devices. Thus, potentially large development teams must all use the same type of XR device to develop an application, even when using various XR devices is preferable. For example, certain XR development tasks may not require use of a camera or other XR device features. Thus, though lower-capability XR devices may be capable of performing the development task, they cannot be used because they are incompatible with the XR application.

In response to recognizing these disadvantages, the inventors have conceived and reduced to practice a software and/or hardware facility for an XR device-based tool for cross-platform content creation and display ("the facility").

As discussed herein, the term "XR" encompasses augmented reality (AR), mixed reality (MR), and virtual reality (VR). As used herein, the term "mixed reality" or "MR" may be used interchangeably with the terms "extended Reality" or "XR," "augmented reality" or "AR," "virtual reality" or "VR." While embodiments described herein are discussed in terms of mixed reality for ease of discussion, various embodiments are directed to AR, MR, or VR experiences. "Cross-platform" refers to the ability to use the XR experience developed on one XR device, or "platform," on other XR devices.

Techniques for creating, publishing, and viewing MR instructional content (i.e., an "MR procedure") using an MR-based application for MR devices such as the Microsoft HoloLens 2® are described. An MR procedure may reflect a series of one or more actions to be taken by a viewer of the MR procedure. An MR procedure typically contains one or more MR steps corresponding to actions in the series of actions. For example, in an MR procedure designed to instruct the viewer how to assemble a drone, a first MR step may include unfolding the front arms of the drone and a second MR step may include unfolding the rear arms of the drone. In some embodiments, animations corresponding to the mixed reality steps are sequentially displayed to guide the viewer through a procedure. The facility in some embodiments causes one or more animations to be displayed in one or more of the MR steps. For example, in the first MR step, the facility may display an animation of the front arms of a drone being unfolded. In some embodiments, the one or more animations depict a condition present in the procedure. For example, an animation spinning a propeller of the drone may be included to indicate a hazard presented by spinning propellers at one or more mixed reality steps in the procedure.

MR procedures can be created in the form of interactive step-by-step instructional guides via an MR development environment on a supported MR device that enable a viewer (also called an end user) in the real-world to see content overlayed in their real-world environment. MR procedures may be distributed via a software as a service (i.e., "SaaS")-based system that enable viewers to create, edit and view content on any MR-supported device using a runtime application via the cloud. MR procedures are anchored to the real-world through different anchor types defined by the creator of the MR procedure. Techniques for creating MR procedures may be similar to those described with respect to a desktop application described in U.S. application Ser. No. 18/583,357, "DEVELOPING MIXED REALITY APPLICATIONS IN CONNECTION WITH A VIRTUAL DEVELOPMENT ENVIRONMENT."

Users can interact with an MR procedure through natural user interface gestures including near-interaction, such as tapping buttons, and far interaction, such as "raycasts" from fingertip positions and finger pinches. Virtual content appears in "World Space" on the MR device and is localized in the environment through environment tracking via the MR device's integrated simultaneous localization and mapping (i.e., SLAM) or world tracking capabilities.

In some embodiments, the facility causes a definition of a mixed reality (MR) procedure to be presented by an editing MR device in a virtual application window. Inputs are received via the editing MR device, the inputs including: first input arranging, in the virtual application window, an anchor for the MR procedure; second input specifying a virtual object to appear in the MR procedure; third input specifying a location, in the virtual application window, of the virtual object relative to the anchor in the MR procedure; and fourth input specifying an MR step in the MR procedure. The facility interprets the received inputs as editing actions performed with respect to the MR procedure definition. The facility alters the MR procedure definition in accordance with the editing actions. The facility creates a device-independent representation of the MR procedure based on the altered MR procedure definition. The facility transforms the device-independent representation into a target MR procedure executable by a target MR device and provides the target MR procedure to the target MR device.

By performing in some or all of the ways described above, the facility provides an MR device-based tool for cross-platform content creation and display. Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, the facility enables less capable MR devices to develop MR procedures that can be run on a wide variety of MR devices.

Further, for at least some of the domains and scenarios discussed herein, the processes described herein as being performed automatically by a computing system cannot practically be performed in the human mind, for reasons that include that the starting data, intermediate state(s), and ending data are too voluminous and/or poorly organized for human access and processing, and/or are a form not perceivable and/or expressible by the human mind; the involved data manipulation operations and/or subprocesses are too complex, and/or too different from typical human mental operations; required response times are too short to be satisfied by human performance; etc. For example, a human mind cannot cause a definition an MR procedure to be presented by an editing MR device in a virtual application window, create a device-independent representation of the MR procedure, or transform the device-independent representation into a target MR procedure executable by a target MR device.

FIG. 1 is a network diagram showing an environment 100 in which the facility operates. In the example shown in FIG. 1, environment 100 includes a server 102 and one or more computing devices 124a-124c (collectively, "computing devices 124"). Examples of computing device 124 include, but are not limited to, XR headsets or other wearable devices, mobile devices, smartphones, tablets, laptop computers, or other computing devices that can present a mixed reality experience to a viewer. Examples of computing devices 124 further include servers, desktop computers, virtual machines, etc.

Server 102 is configured as a computing system, e.g., a cloud computing resource, that implements and executes software as a service module 104 and mixed reality procedure conversion module 105. In various embodiments, a separate instance of the software as a service module 104 is maintained and executed for each of the one or more computing devices 124. The software as a service module 104 may be used to provide MR procedures created using a first computing device such as computing device 124*a* to a different computing device such as computing device 124*b*.

Server 102 is configured to receive input data from a first computing device such as computing device 124*a* and use MR procedure conversion module 105 to convert the input data into a device-independent MR procedure. For example, the input data may specify positions of one or more virtual objects of the MR procedure, instructional text associated with one or more steps of the MR procedure, etc. In some embodiments, computing device 124 converts the input data into the device-independent MR procedure and sends the device-independent MR procedure to server 102.

In some embodiments, server 102 uses MR procedure conversion module 105 to convert the device-independent MR procedure into various device-specific MR procedures for various target MR devices such as computing device B 124*b* or computing device C 124*c*. The various target MR devices may have different application development interfaces (APIs), input capabilities, rendering capabilities, environment tracking capabilities, etc. Thus, MR procedure conversion module 105 may convert the device-independent MR procedure into an MR procedure for a target MR device by mapping input, rendering, or environmental tracking functionalities of the device-independent MR procedure to input, rendering, or environmental tracking functionalities of the target MR device.

In some embodiments, server 102 distributes the target MR procedure to a target device such as computing device B 124*b*. In this way, the facility enables cross-platform MR content creation and display.

In an example embodiment, server 102 is configured to obtain input editing an MR procedure via computing device 124*a*. Server 102 then uses MR procedure conversion module 105 to create a device-independent representation of the MR procedure based on the input. Server 102 then uses MR procedure conversion module 105 to transform the device-independent representation of the MR procedure into a target MR procedure to be executed or edited using a target MR device. Server 102 then provides the target MR procedure to the target MR device. This enables MR procedures to be displayed, created, or both, across multiple MR devices having different capabilities.

In some embodiments, the facility provides one or more of modules 126*a*, 128*a*, or 126*b* (the modules) as a software as a service (SaaS). Accordingly, server 102 in various embodiments controls deployment of the modules to computing devices 124 depending upon a subscription. In an example embodiment, software as a service module 104 provides computing device 124*a* access to mixed reality procedure display module 126*a* or mixed reality procedure editing module 128*a*. In some embodiments, the facility provides information used by mixed reality procedure display module 126*a* or mixed reality procedure editing module 128*a* through server 102 such that software as a service module 104 enables or disables module functionality according to a subscription. In some embodiments, one or more of computing devices 124 or server 102 are controlled by a same entity.

Software as a service module 104 supports various modules for computing devices 124 depending upon a permission of the computing device. In the example shown in FIG. 1, computing device 124*a* includes mixed reality procedure display module 126*a*; mixed reality procedure editing module 128*a*; audio output module 130*a* configured to provide audio output; camera module 132*a* configured to obtain image data; orientation, location, and/or motion tracking module 134*a* configured to obtain orientation, location, and/or motion tracking data; and audio input module 136*a* configured to obtain audio input. In some embodiments, some or all of components 128*a*-136*a* are also present in computing device B 124*b* (not shown).

In various embodiments, mixed reality procedure display module 126*a* receives data from a camera, lidar scanner, etc., including data based on a physical reference object. Then, computing device 124*b* provides a mixed reality procedure to a user based on the data.

While FIG. 1 depicts MR procedure conversion module 105 as implemented using server 102, in various embodiments, functionality of MR procedure conversion module 105, or a portion thereof, is implemented using another device such as computing device A 124*a*. For example, SaaS module 104 may permit computing device A 124*a* to transform an MR procedure created using MR procedure editing module 128*a* into a device-independent representation.

Additionally, while FIG. 1 discusses distributing MR procedures, the disclosure is not so limited. In some embodiments, MR procedure definitions, such as an MR procedure definition usable to display the interfaces shown in FIGS. 4-13, are distributed. Accordingly, an MR procedure may be edited using various MR devices.

Figure 2:
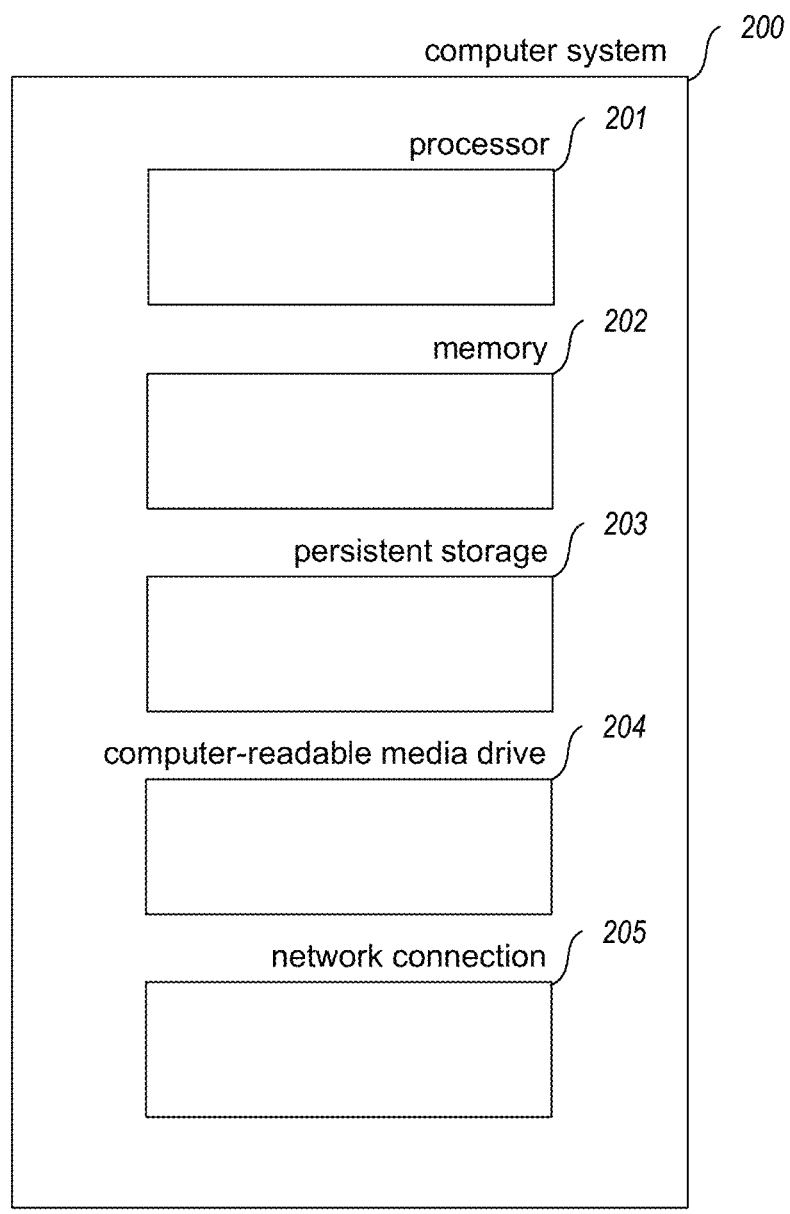
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 201 for executing computer programs and/or training or applying machine learning models, such as a CPU, GPU, TPU, NNP, FPGA, or ASIC; a computer memory 202—such as RAM, SDRAM, ROM, PROM, etc.—for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. None of the components shown in FIG. 2 and discussed above constitutes a data signal per se. While computer systems configured as described above are typically used to support the operation of the facility, those skilled in the art will appreciate that the facility may be implemented using devices of various types and configurations, and having various components.

Figure 3:
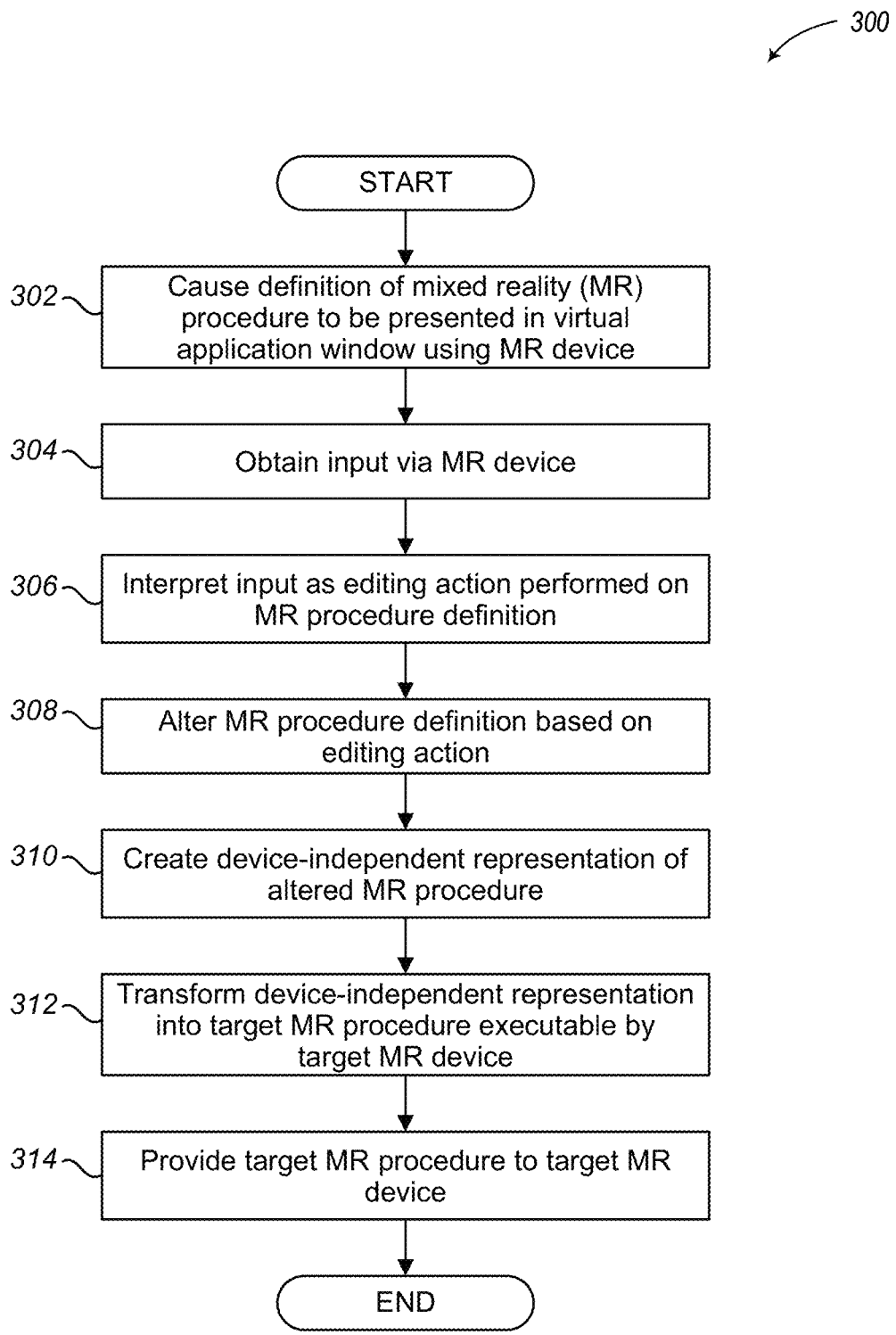
FIG. 3 is a logical flow diagram showing a process used by the facility in some embodiments to provide an XR device-based tool for cross-platform content creation and display.

FIG. 3 is a logical flow diagram showing a process 300 used by the facility in some embodiments to provide an XR device-based tool for cross-platform content creation and display.

Process 300 begins, after a start block, at block 302, where the facility causes a definition of a mixed reality (MR) procedure to be presented in a virtual application window using an MR device. FIGS. 4-13 show various examples of displaying a definition of an MR procedure in a virtual application window using an MR device. After block 302, process 300 continues to block 304.

At block 304, the facility obtains input via the MR device. In some embodiments, the input is obtained via performing hand tracking to discern user control gestures comprising a far touch, far pinch, or near touch, for example. A far touch refers to an input wherein a ray is traced from the user's hand. A far touch may be used to touch a key of a virtual keyboard that does not appear to be in the user's reach in the MR procedure. A near touch refers to an input wherein the user touches a displayed virtual object. For example, a user may touch a key of a virtual keyboard object to provide text input using a near touch.

In some embodiments, the input is obtained via controller tracking and comprises a far select.

In some embodiments, the input is obtained via eye tracking and comprises a far select or a far hover.

In various embodiments, the input is any input obtainable via the MR device. For example, the input may include audio input obtained via a microphone of the MR device, orientation input obtained using an inertial measurement unit of the MR device, etc. After block 304, process 300 continues to block 306.

At block 306, the input is interpreted as an editing action performed on the MR procedure definition. For example, movement of a virtual object in the MR procedure definition is interpreted as editing the MR procedure definition. After block 306, process 300 continues to block 308.

At block 308, the MR procedure definition is altered based on the editing action. Continuing the previous example, the MR procedure definition is altered to reflect the movement of the virtual object. After block 308, process 300 continues to block 310.

At block 310, a device-independent representation of the altered MR procedure is created. In some embodiments, the device-independent representation is created by mapping features of the altered MR procedure to features of the device-independent representation.

In some embodiments, the facility creates the device-independent representation by using a schema to generate, based on the altered MR procedure, a serialized representation including human-readable code. The human-readable code includes a hierarchy of tagged elements, such as XML elements, that includes a version indicator and a type of computer vision tracking to be used in an MR experience. The hierarchy of tagged elements further includes an indication of a virtual object, the indication including a position relative to an origin in the MR experience at which to place the virtual object and a function to be applied to the MR experience in response to the placement.

Techniques for creating device-independent representations of MR procedures are discussed in further detail in U.S. application Ser. No. 18/583,362, filed Feb. 21, 2024, and entitled "SERIALIZING AND DESERIALIZING MIXED REALITY EXPERIENCES OR PORTIONS THEREOF," which is incorporated by reference in its entirety. After block 310, process 300 continues to block 312.

At block 312, the device-independent representation is transformed into a target MR procedure executable by a target MR device.

In some embodiments, to transform the device-independent representation into the target MR procedure, the facility generates, based on the serialized representation and the version indicator, the target MR procedure to be executed using the target MR device. The target MR procedure is usable to place the virtual object at the position relative to the origin, execute the function in response to the placement, and track, by the type of computer vision tracking, a position relative to the origin of a camera coupled to an MR device displaying the MR procedure.

In various embodiments, the device-independent representation is transformed into the target MR procedure based on a mapping between features of the device-independent representation and features of the target MR procedure. For example, data in the device-independent representation for an anchor in the MR procedure may be converted into data for an anchor in the target MR procedure.

Techniques for creating the target MR procedure based on the device-independent representation of the MR procedures are discussed in further detail in U.S. application Ser. No. 18/583,362, filed Feb. 21, 2024, and entitled "SERIALIZING AND DESERIALIZING MIXED REALITY EXPERIENCES OR PORTIONS THEREOF," which is incorporated by reference in its entirety. After block 312, process 300 continues to block 314.

At block 314, the target MR procedure is provided to the target MR device. In some embodiments, the target MR procedure is distributed as an application to the MR device. In some embodiments, the target MR procedure is streamed to the target MR device, such as using SaaS module 104 of FIG. 1. After block 314, process 300 ends at an end block.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 15:
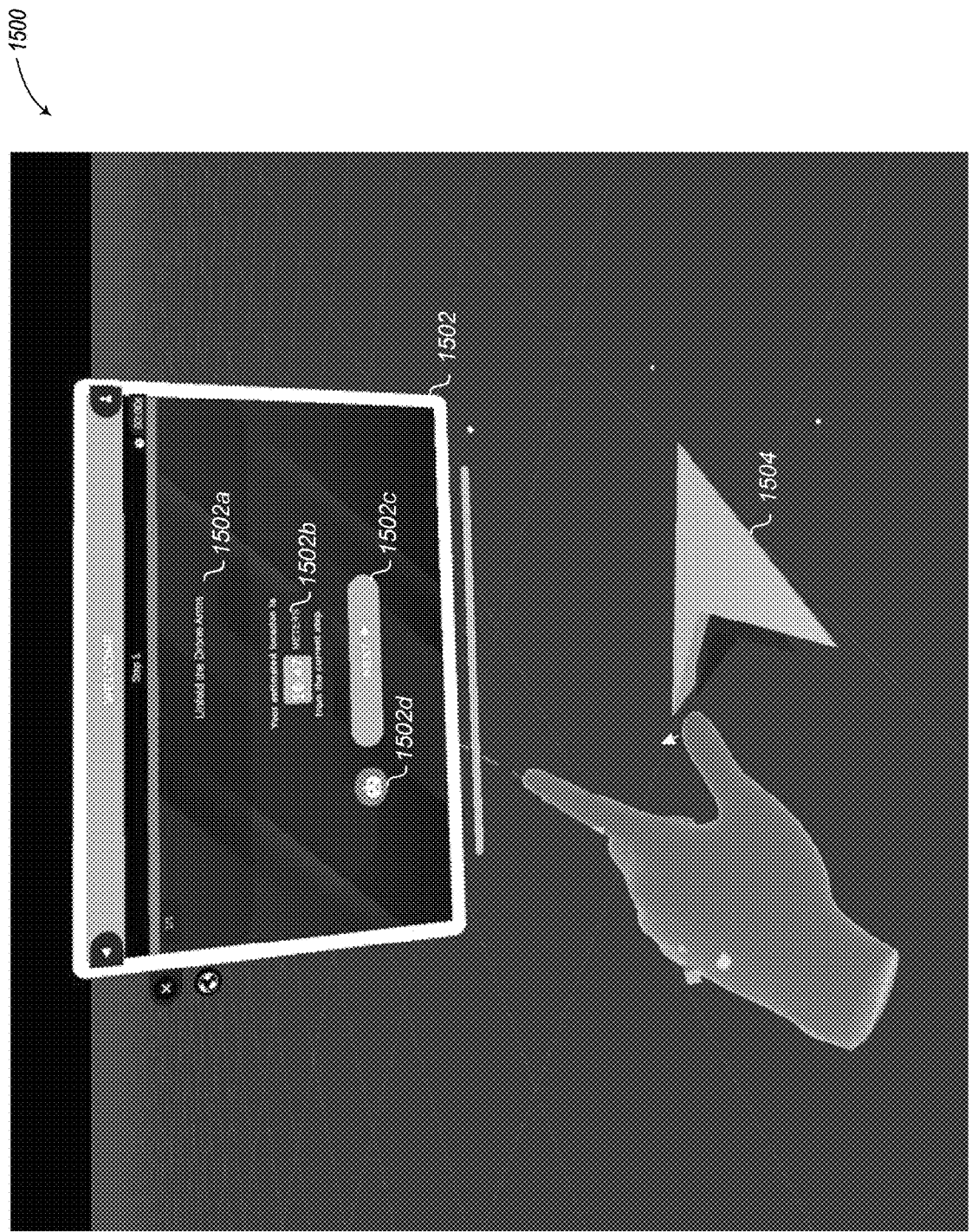
FIG. 15 is a display diagram illustrating an interface used by the facility in some embodiments to display a step of an MR procedure.

FIGS. 4-13 illustrate example interfaces displayed to a user using an XR device-based tool for cross-platform content creation and display. In the example shown in FIGS. 4-13, the user is creating an MR step of an MR procedure that demonstrates how to assemble a drone. An example interface of the resulting MR procedure is shown in FIG. 15.

Figure 4:
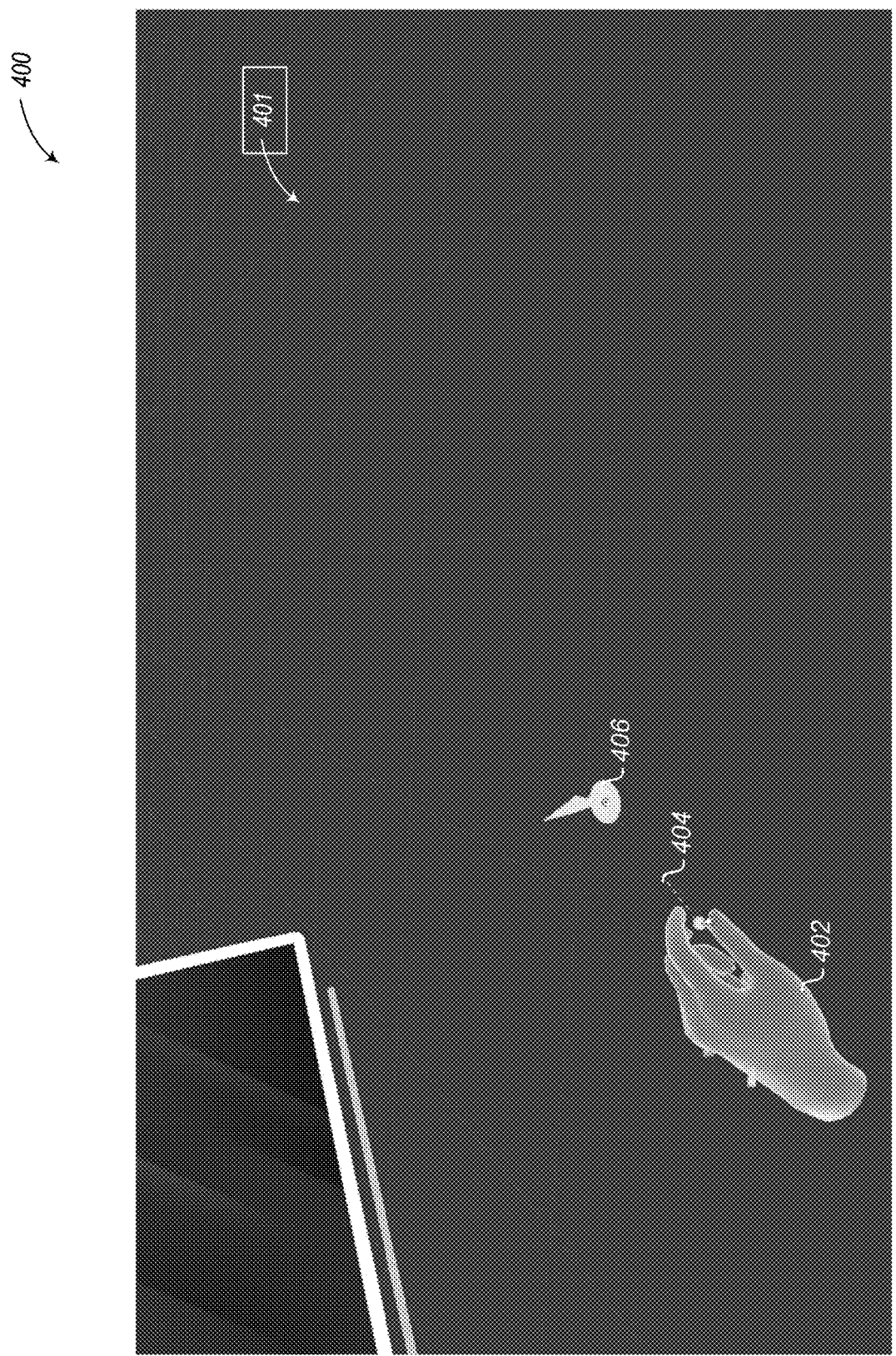
FIG. 4 is a display diagram illustrating an interface used by the facility in some embodiments to place an anchor for an MR procedure.

FIG. 4 is a display diagram illustrating an interface 400 used by the facility in some embodiments to place an anchor for an MR procedure. Interface 400 is a visual user interface presented to a user using an XR device.

Interface 400 includes hand 402, traced ray 404, and anchor 406. Interface 400 simulates a view of a definition of an MR procedure displayed to a user using an MR device.

Hand 402 represents the user's hand. In various embodiments, the user interacts with virtual objects such as anchor 406 displayed interface 400 using hand 402.

Anchor 406 is an anchor for the MR procedure. An anchor is an expected feature in an environment that is detected and tracked by a mixed reality device to ensure that virtual artifacts in a mixed reality experience appear to a viewer of the mixed reality experience to stay at the same position and orientation in space. In various embodiments, the anchor is an image anchor, an object anchor, a geo anchor, a location anchor, an auto anchor, etc. An image anchor includes a single predefined image or Quick Response (i.e., "QR") code to be detected. An object anchor includes a reference model to be detected. A geo anchor includes a GPS location to be detected, while a location anchor includes one or more features in a physical environment to be detected.

Traced ray 404 is traced from hand 402, such as from a central axis of the index finger of the hand 402. Anchor 406 is placed at the intersection of traced ray 404 and a mesh 401. By moving hand 402, the user changes where traced ray 404 intersects mesh 101, moving the anchor 406.

In some embodiments, anchor 406 may be moved while hand 402 maintains a selected position, such as pinching a thumb and forefinger as shown. When the user releases the selected position, display of traced ray 404 is discontinued. Accordingly, anchor 406 stops moving and remains at the last intersection point of traced ray 404 and mesh 401.

In some embodiments, movement of the anchor may be reinitiated after the selected position is discontinued by reinitiating the selected position. For example, the user may resume display of traced ray 404 by again pinching the thumb and forefinger of hand 402 while pointing at anchor 406 as shown in FIG. 4.

While the mesh 401 shown in FIG. is a plane, the disclosure is not so limited. In various embodiments, mesh 401 is a 3-dimensional mesh. In various embodiments, mesh 401 corresponds to a real-world environment around the user. For example, mesh 401 may be created based on image data received from a camera of the MR device.

In some embodiments, interface 400 includes a pass-through rendering of the real-world environment around the user based on the image data received from the camera of the MR device.

In some embodiments, interface 400 is displayed using a transparent or semi-transparent display of the MR device, such that the real-world environment around the user is visible through the display.

In some embodiments, the anchor is a physical object that is placed in a real-world environment around the user. For example, the anchor may be an object such as a sticker including a QR code.

While FIG. 4 and each of the display diagrams discussed below show a display whose formatting, organization, informational density, etc., is best suited to certain types of display devices, those skilled in the art will appreciate that actual displays presented by the facility may differ from those shown, in that they may be optimized for particular other display devices, or have shown visual elements omitted, visual elements not shown included, visual elements reorganized, reformatted, revisualized, or shown at different levels of magnification, etc.

Figure 5:
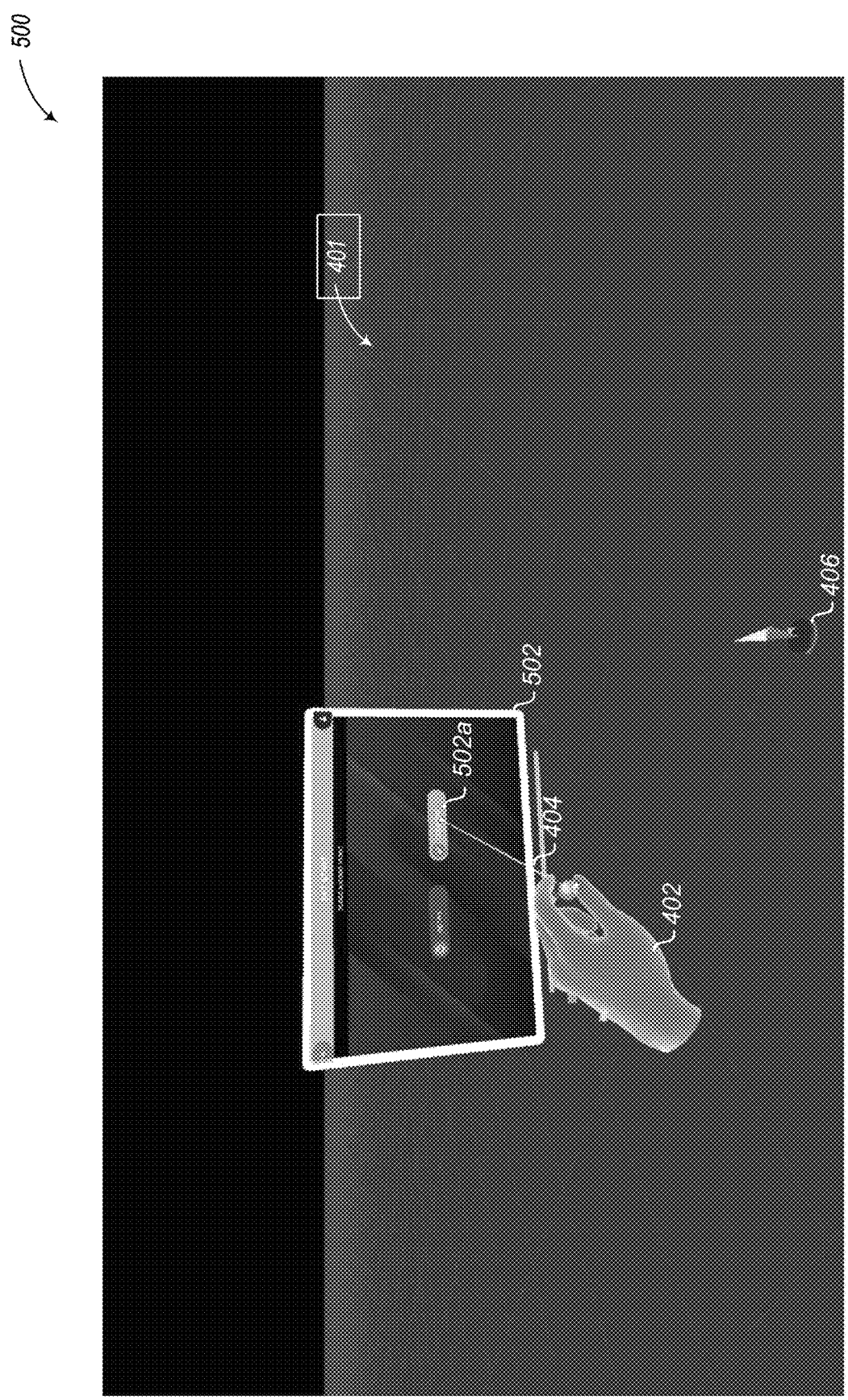
FIG. 5 is a display diagram illustrating an interface used by the facility in some embodiments to confirm placement of an anchor for an MR procedure.

FIG. 5 is a display diagram illustrating an interface 500 used by the facility in some embodiments to confirm placement of an anchor for an MR procedure. Interface 500 is a visual user interface presented to a user using an XR device.

Interface 500 includes spatial user interface (i.e., "spatial UI") 502 with which the user can interact to confirm placement of anchor 406 by selection of virtual input 502a. In some embodiments, spatial UI 502 is displayed as an overlay such that a position, scale, orientation, or any combination thereof, of spatial UI 502 is consistent in interface 500 regardless of a position or field of view of the user. For example, interface object 502 may comprise a heads-up display (i.e., "HUD") or other overlay of interface 500.

In some embodiments, spatial UI 502 is displayed as a virtual object at a coordinate of mesh 401, such that a position, scale, orientation, or any combination thereof, changes based on an orientation of the user. In some such embodiments, interface object 502 is active when the user is within a threshold distance of interface object 502 in mesh 401. In some embodiments, interface object 502 is inactive when the user is not within a threshold distance of interface object 502 in mesh 401.

Figure 6:
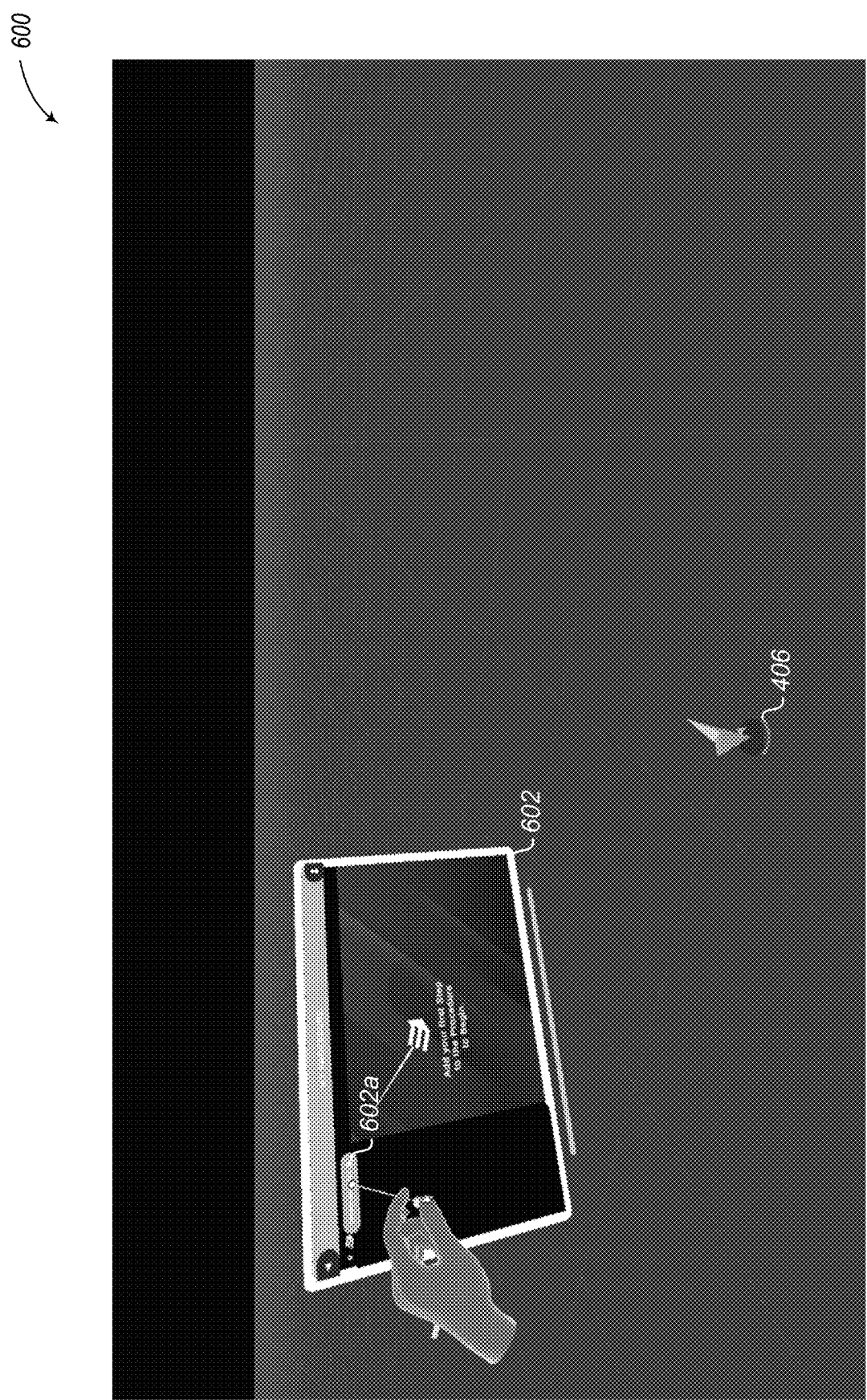
FIG. 6 is a display diagram illustrating an interface used by the facility in some embodiments to add an MR step to an MR procedure.

In some embodiments, selection of virtual input 502a confirms the position of anchor 406 and causes interface 600 of FIG. 6 to be displayed.

For each of the display diagrams discussed below, any virtual UI in an interface may be displayed as an overlay or as a virtual object at a coordinate in a mesh as discussed herein.

FIG. 6 is a display diagram illustrating an interface 600 used by the facility in some embodiments to add a step to an MR procedure. Interface 600 is a visual user interface presented to a user using an XR device.

Interface 600 includes interface object 602, which instructs the user to add a step to the MR procedure. Interface object 602 includes virtual input 602a. In some embodiments, selection of virtual input 602a causes interface 700 of FIG. 7 to be displayed.

Figure 7:
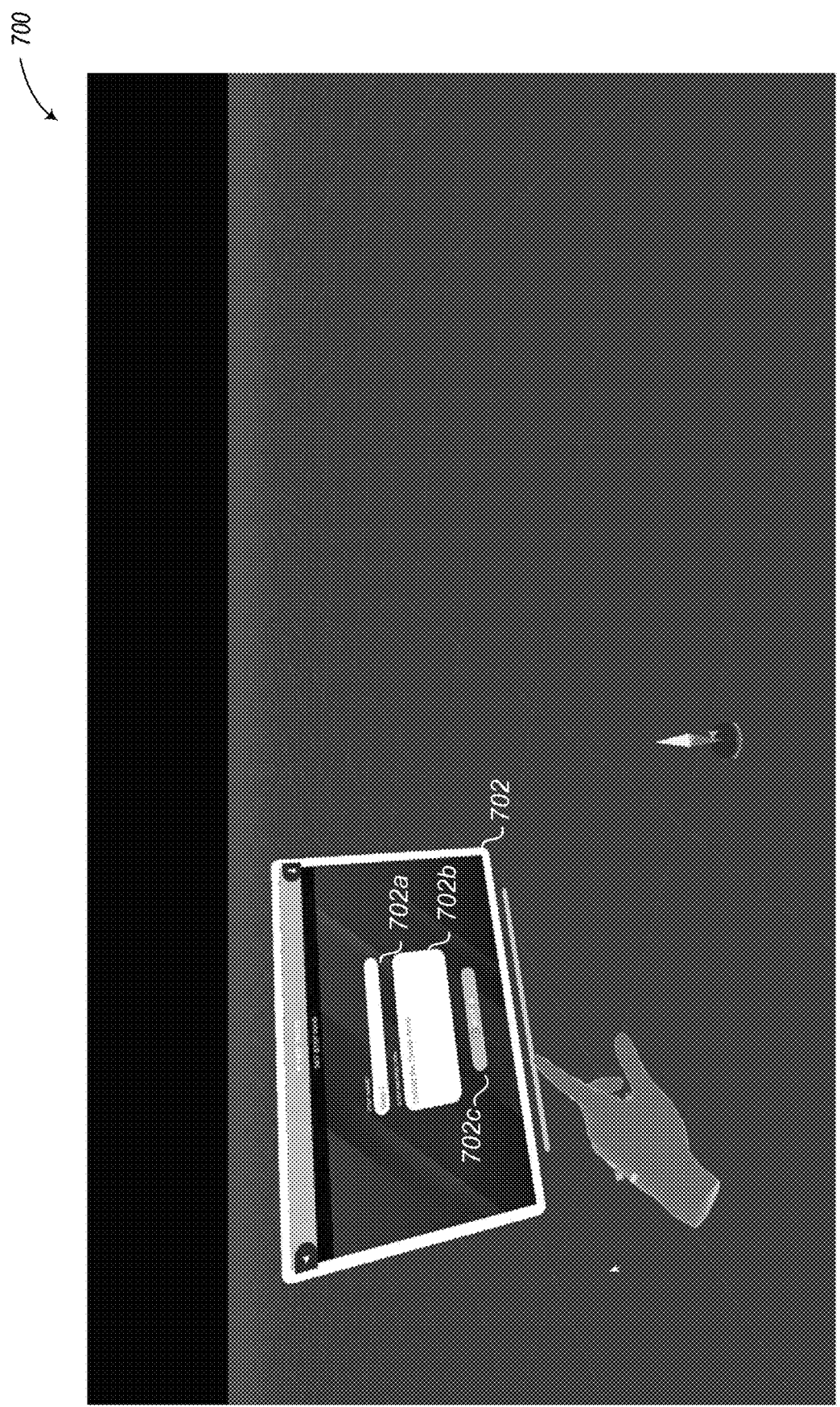
FIG. 7 is a display diagram illustrating an interface used by the facility in some embodiments to add MR step information to an MR step of an MR procedure.

FIG. 7 is a display diagram illustrating an interface 700 used by the facility in some embodiments to add MR step information to an MR step of an MR procedure. Interface 700 is a visual user interface presented to a user using an XR device. Interface 700 includes spatial UI 702, which the user interacts with to add MR step information to an MR step of an MR procedure.

Spatial UI 702 includes step name field 702a, step instructions field 702b, and next input 702c.

In some embodiments, step name field 702a or step instructions field 702b are populated using voice-to-text applied to voice input received via a microphone of the XR device.

Figure 16:
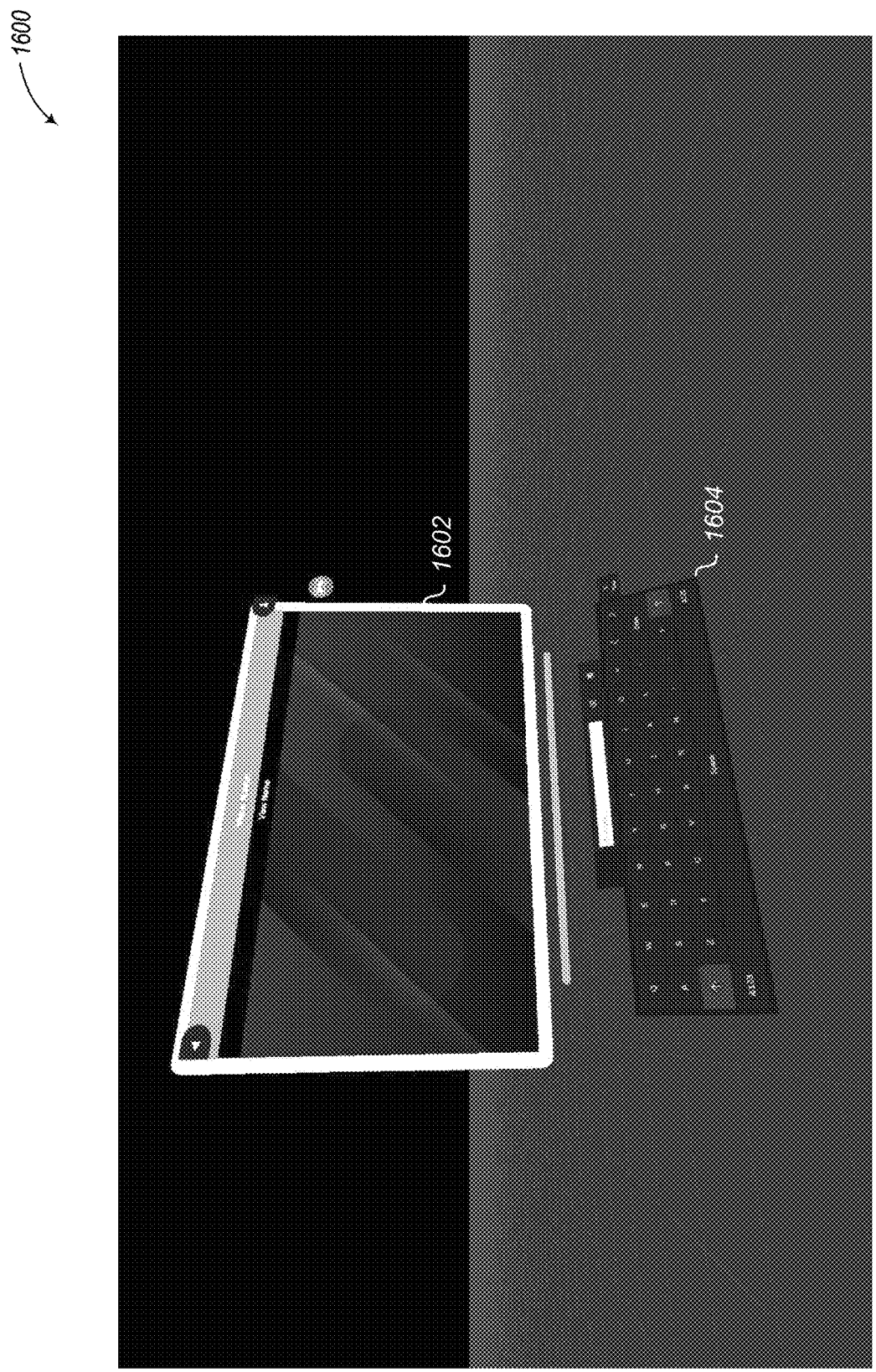
FIG. 16 is a display diagram illustrating an interface used by the facility in some embodiments to display a virtual keyboard object of an MR procedure.

In some embodiments, step name field 702a or step instructions field 702b are populated based on input received via a virtual keyboard object displayed in interface 700, such as the virtual keyboard object shown in FIG. 16. In some embodiments, spatial UI 702 includes the virtual keyboard object. In some embodiments, the virtual keyboard object is displayed separately from spatial UI 702.

Figure 8:
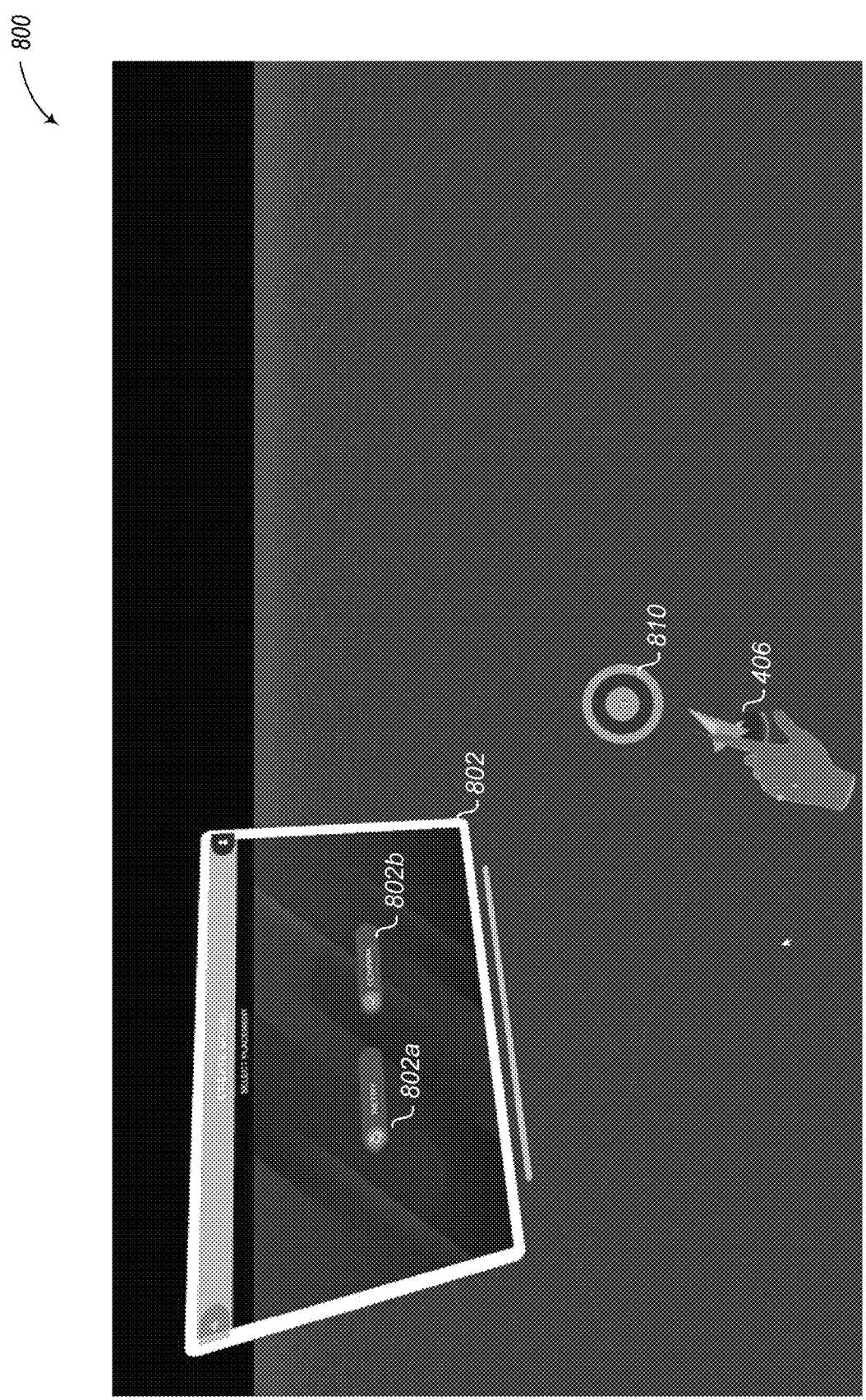
FIG. 8 is a display diagram illustrating an interface used by the facility in some embodiments to select a location at which to add a reference model for an MR procedure.

FIG. 8 is a display diagram illustrating an interface 800 used by the facility in some embodiments to select a location at which to add a reference model for an MR procedure. Interface 800 is a visual user interface presented to a user using an XR device.

Interface 800 includes spatial UI 802, which includes retry button 802a and confirmation button 802b. The user may provide input such as gestural input to move location indicator 810 to a position at which the reference model is to be added. Confirmation button 802b is usable to confirm placement of location indicator 810. Retry button 802a is usable to retry placement of location indicator 810. In some embodiments, when the facility receives selection of confirmation button 802b, the facility causes interface 900 of FIG. 9 to be displayed. In some embodiments, when the facility receives selection of retry button 802a, the facility automatically returns location indicator 810 to a default position, such as at a position of anchor 406.

Figure 9:
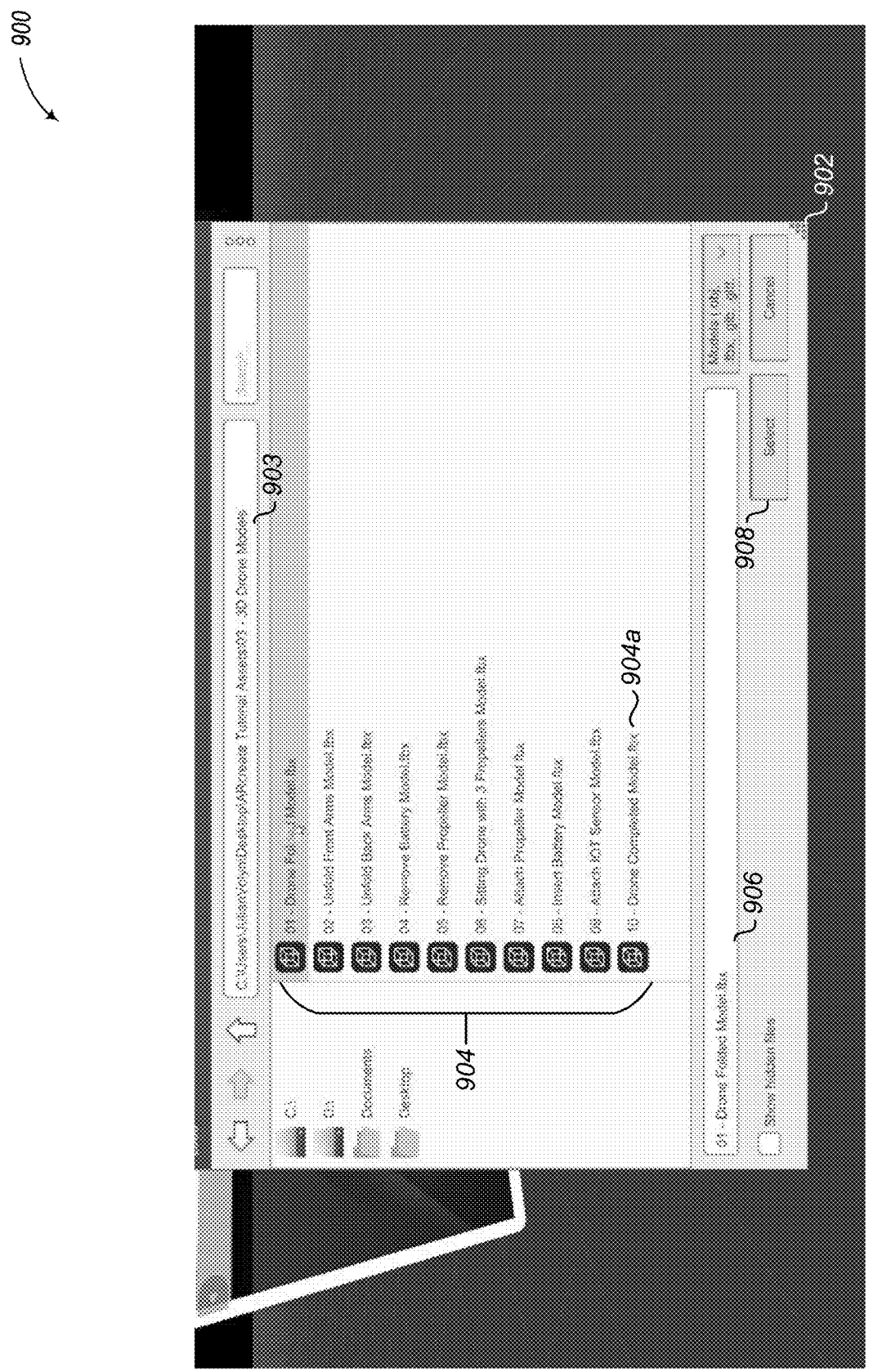
FIG. 9 is a display diagram illustrating an interface used by the facility in some embodiments to receive selection of a reference model to be displayed in the MR procedure.

FIG. 9 is a display diagram illustrating an interface 900 used by the facility in some embodiments to receive selection of a reference model to be displayed in the MR procedure. Interface 900 is a visual user interface presented to a user using an XR device. Interface 900 includes file navigation UI 902.

In the example shown in FIG. 9, a user navigates to directory path 903 to view reference model files 904. The user then selects a reference model file among reference model files 904, such as reference model file 904a. The name of the reference model file 904a is displayed in selection field 906. The user then confirms the selection with select button 908.

In some embodiments, file navigation UI 902 is displayed as an overlay. In some embodiments, file navigation UI 902 is displayed as a virtual object.

Figure 10:
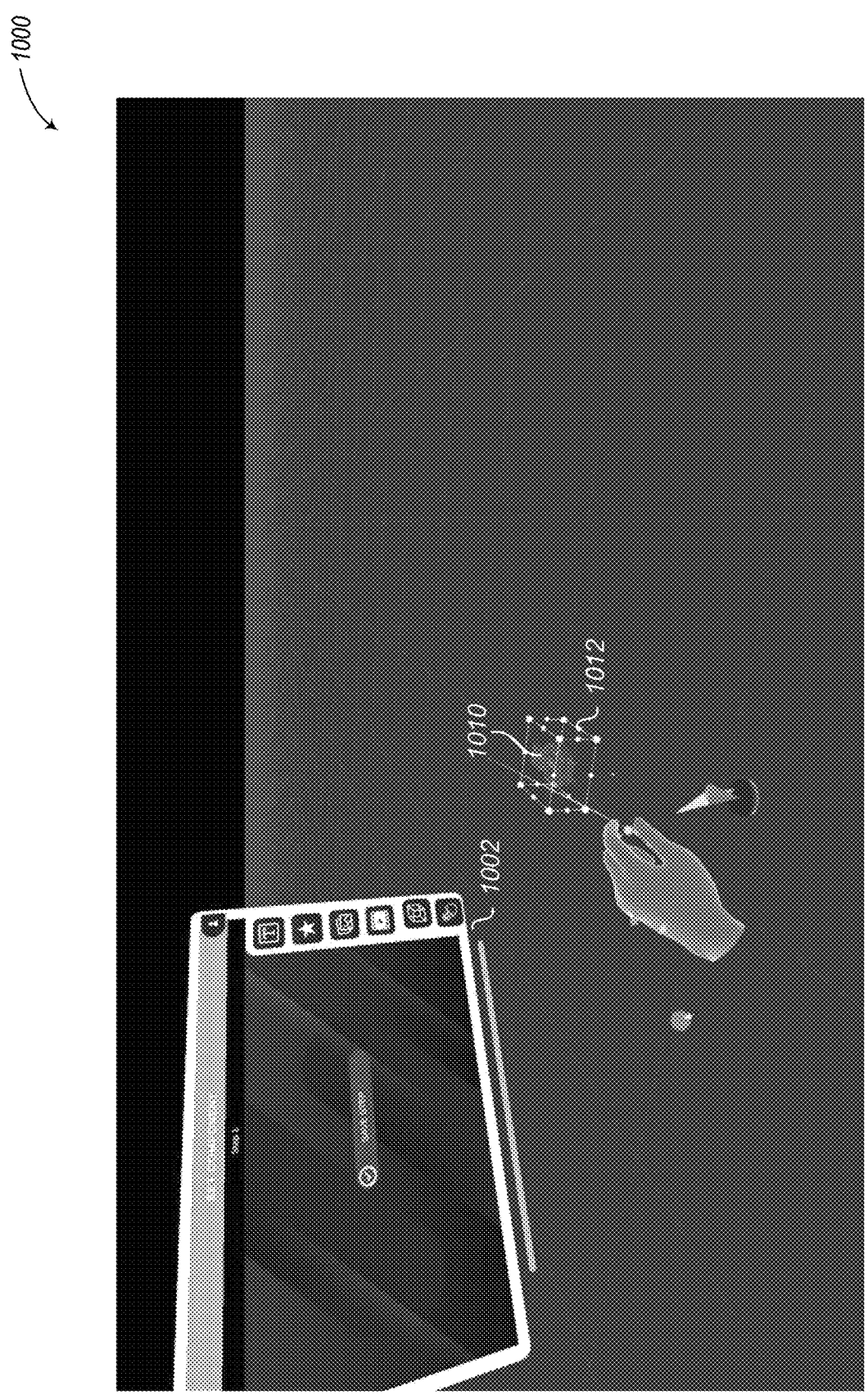
FIG. 10 is a display diagram illustrating an interface used by the facility in some embodiments to receive selection of a reference model of an MR procedure.

FIG. 10 is a display diagram illustrating an interface 1000 used by the facility in some embodiments to receive selection of a reference model of an MR procedure. Interface 1000 is a visual user interface presented to a user using an XR device. Interface 1000 includes spatial UI 1002, reference model 1010, and bounding mesh 1012. The user selects reference model 1010 for manipulation by selecting a point inside the bounding mesh 1012. For example, the user may guide a ray traced from their hand to bounding mesh 1012 to select reference model 1010.

In various embodiments, bounding mesh 1012 includes any number of polygons in any shape. For example, bounding mesh 1012 may be a sphere, cube, prism, etc. Typically, bounding mesh 1012 is a minimum bounding box.

Figure 11:
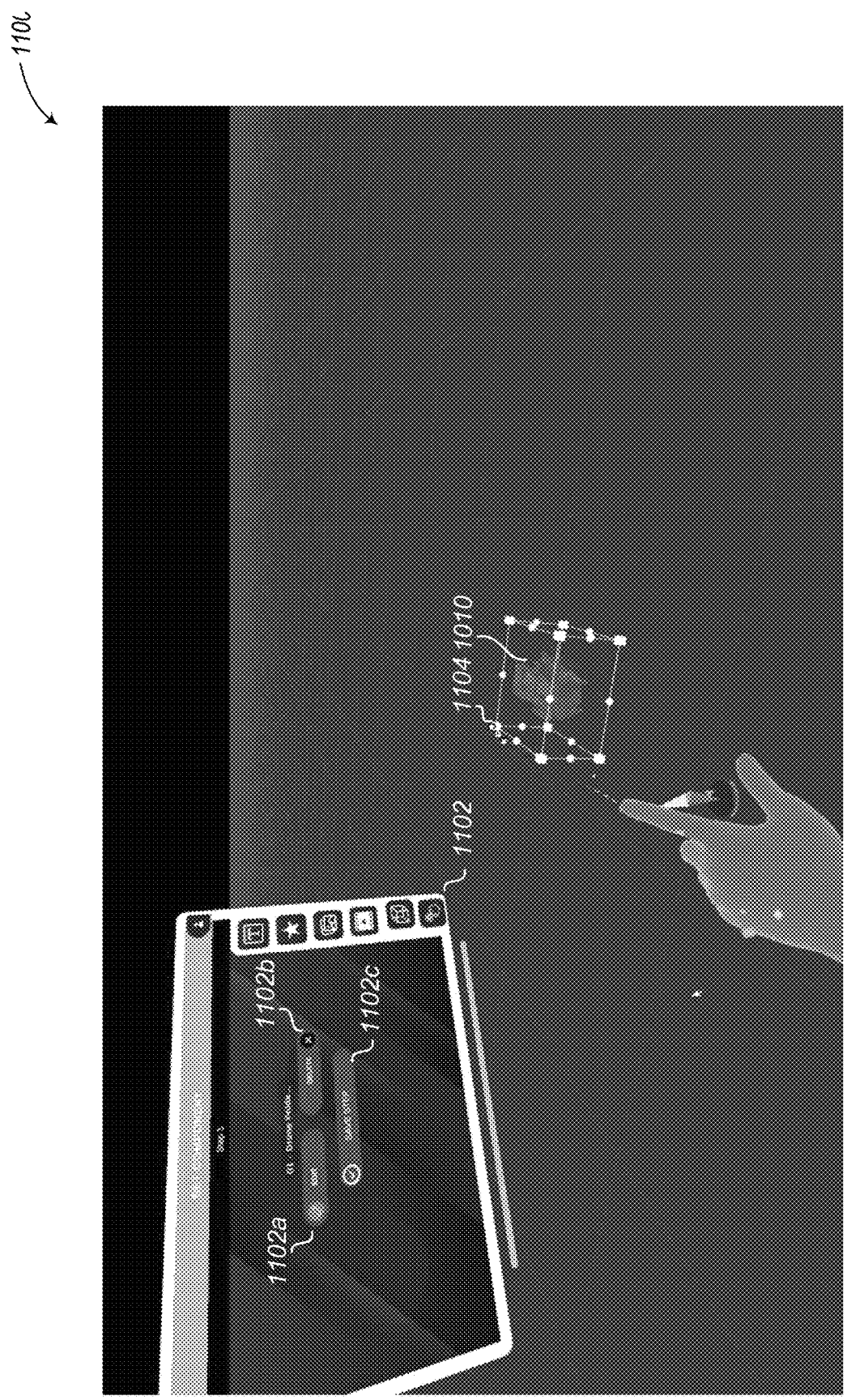
FIG. 11 is a display diagram illustrating an interface used by the facility in some embodiments to receive manipulation of a reference model of an MR procedure.

In some embodiments, selection of reference model 1010 causes interface 1100 of FIG. 11 to be displayed.

FIG. 11 is a display diagram illustrating an interface 1100 used by the facility in some embodiments to receive manipulation of a reference model of an MR procedure. Interface 1100 is a visual user interface presented to a user using an XR device. Interface 1100 includes spatial UI 1102, which includes edit button 1102a, delete button 1102b, and save button 1102c. In some embodiments, the facility enables editing of bounding mesh 1104 in response to receiving selection of edit button 1102a. In some embodiments, edit button 1102a is toggleable to enable and disable editing of bounding mesh 1104. In some embodiments, the facility deletes bounding mesh 1104 in response to receiving selection of delete button 1102b. In some embodiments, the facility displays interface 1200 of FIG. 12 in response to receiving selection of save button 1102c.

In the example shown in FIG. 11, the user manipulates a scale of bounding mesh 1104. By adjusting the scale of bounding mesh 1104, selection characteristics of reference model 1010 may be modified. For example, increasing the scale of bounding mesh 1104 increases a volume around reference model 1010 by which reference model 1010 may be selected.

In various embodiments, any point of bounding mesh 1104 is separately modified based on user input. For example, a point of bounding mesh 1104 may be moved based on user input, and lines of the bounding mesh connected to the point may automatically be redrawn to accommodate the move.

In some embodiments, bounding mesh 1104 is modified for a selected step of the MR procedure. For example, in MR steps of the MR procedure wherein an end user of the MR procedure is expected to select reference model 1010, one or more scales of bounding mesh 1104 may be increased such that reference model 1010 may be easily selected. In MR steps wherein the end user is not expected to select reference model 1010, one or more scales of bounding mesh 1104 may be decreased to reduce a likelihood of the end user inadvertently selecting reference model 1010.

Figure 12:
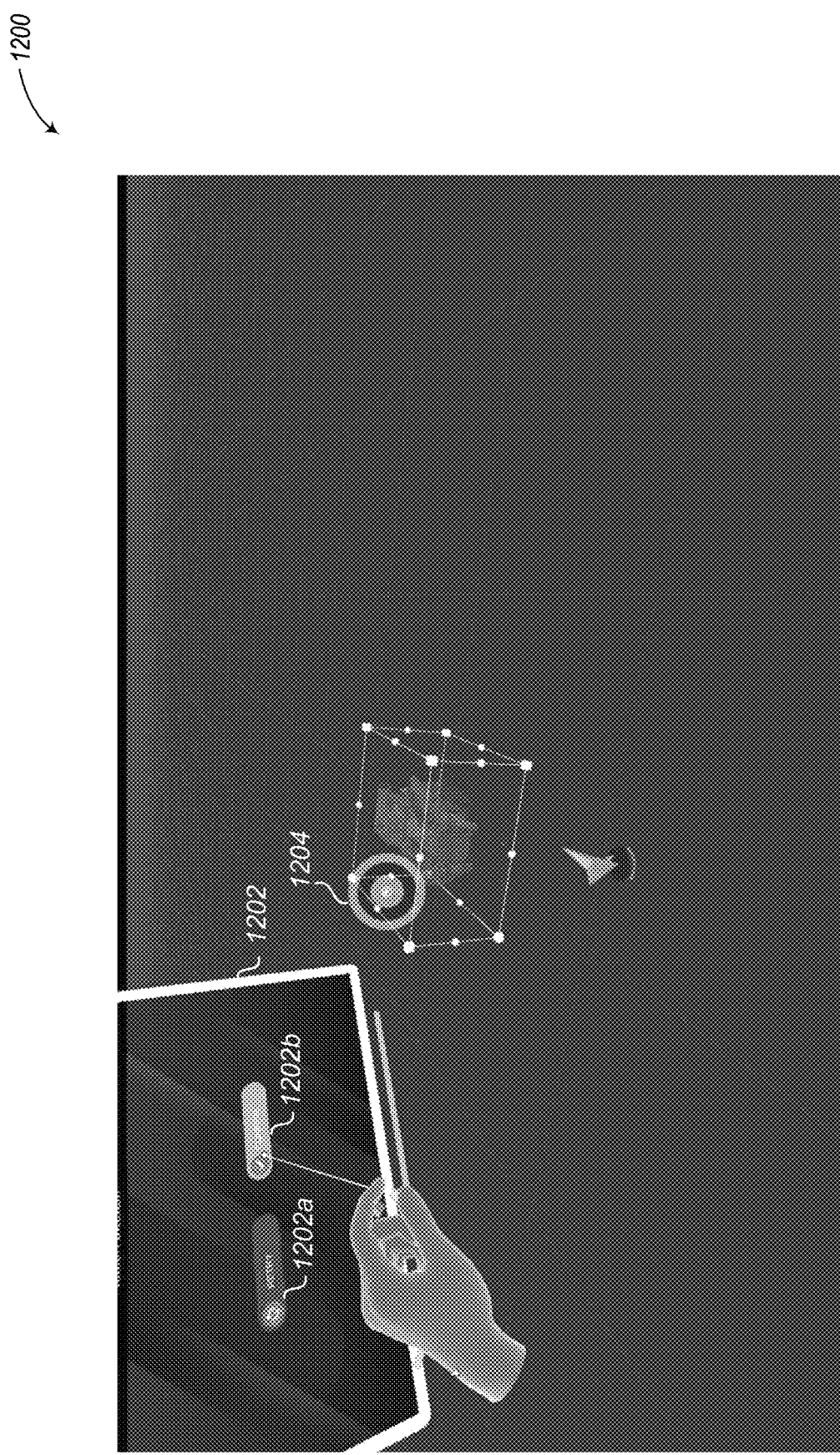
FIG. 12 is a display diagram illustrating an interface used by the facility in some embodiments to receive selection of a location at which to display a tooltip of an MR procedure.

FIG. 12 is a display diagram illustrating an interface 1200 used by the facility in some embodiments to receive selection of a location at which to display a tooltip of an MR procedure. Interface 1200 is a visual user interface presented to a user using an XR device. In various embodiments, interface 1200 employs embodiments of interface 800 of FIG. 8 to receive selection of the location at which to display the tooltip of the MR procedure.

Figure 13:
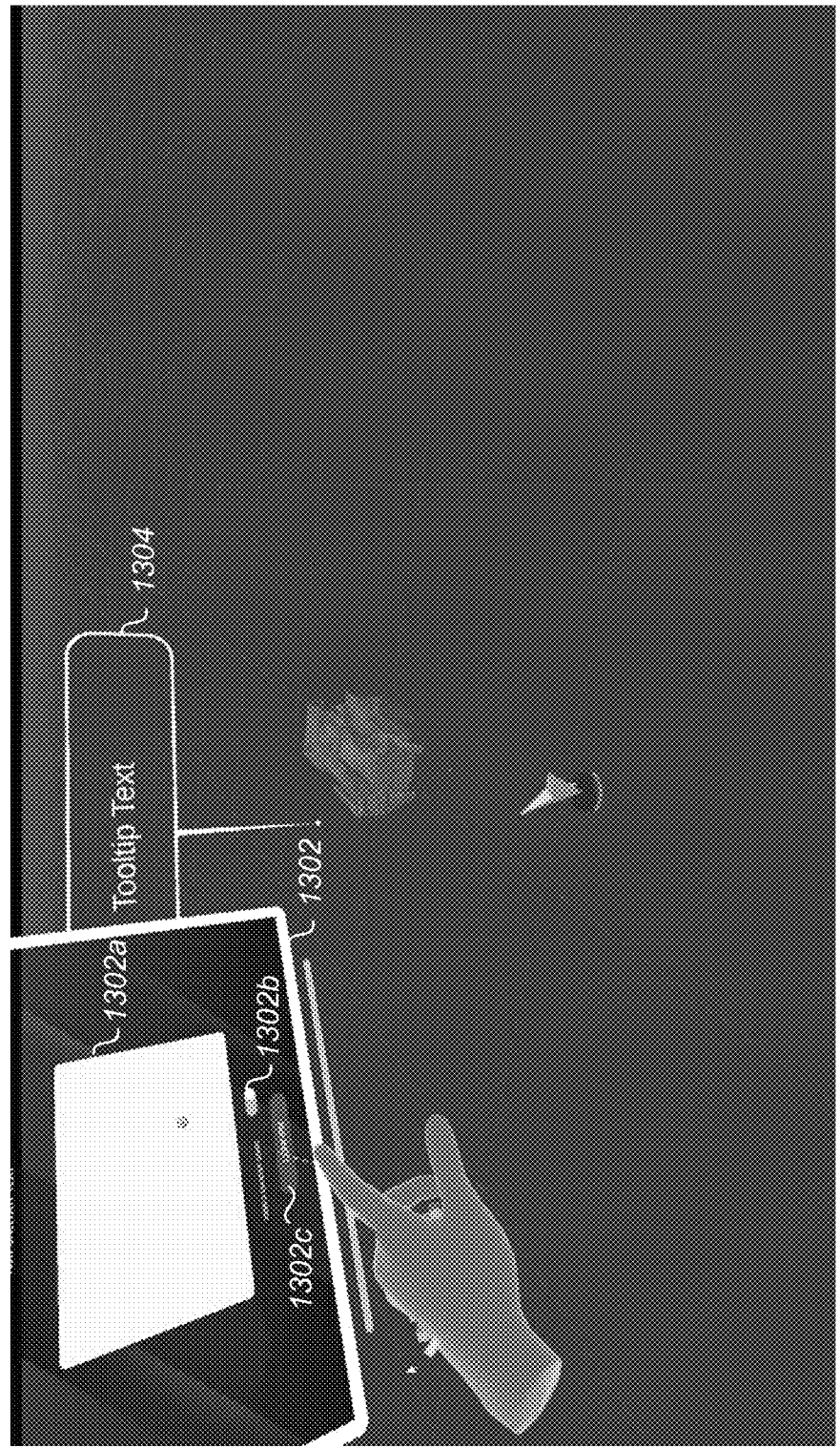
FIG. 13 is a display diagram illustrating an interface used by the facility in some embodiments to enable customization of a tooltip of an MR procedure.

FIG. 13 is a display diagram illustrating an interface 1300 used by the facility in some embodiments to enable customization of a tooltip of an MR procedure. Interface 1300 is a visual user interface presented to a user using an XR device. Interface 1300 includes spatial UI 1302 and virtual tooltip object 1304.

Spatial UI includes tooltip text input field 1302a, tooltip visibility toggle 1302b, and confirm button 1302c. The facility uses tooltip text input field 1302a to receive text to be displayed on virtual tooltip object 1304. Tooltip visibility toggle 1302b is used to toggle whether the tooltip text is displayed upon start of the MR step in the MR procedure. Confirm button 1302c is used to confirm the tooltip text input using tooltip text input field 1302a.

Figure 14:
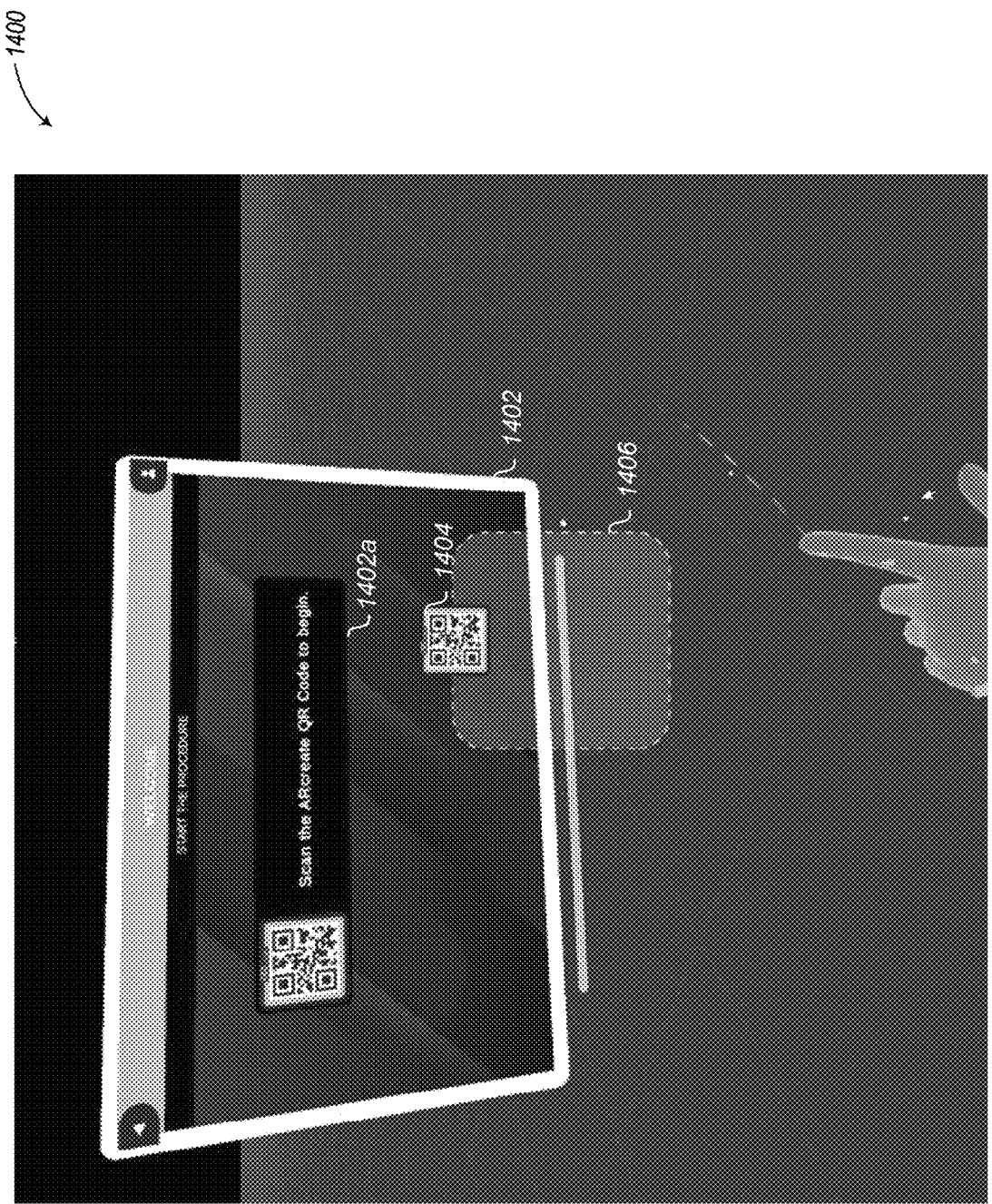
FIG. 14 is a display diagram illustrating an interface used by the facility in some embodiments to launch an MR procedure.

FIG. 14 is a display diagram illustrating an interface 1400 used by the facility in some embodiments to launch an MR procedure. Interface 1400 is a visual user interface presented to a user using an XR device. Interface 1400 includes spatial UI 1402, anchor 1404, and anchor targeting box 1406.

Spatial UI includes instructions for an end user to scan anchor 1404 to begin the MR procedure. For example, the end user may scan anchor 1404 in the real world using a camera of a phone to begin the MR procedure. To scan anchor 1404, the user aligns anchor targeting box 1406 with anchor 1404. Typically, anchor targeting box 1406 is displayed over interface 1400 as an overlay. In some embodiments, anchor targeting box 1406 is moved based on input received from the end user by performing eye tracking on the end user. In some embodiments, anchor targeting box 1406 is moved based on tracking an orientation of the MR device, such as by using a gyroscope or a camera of the MR device. In some embodiments, the facility displays a reference model such as reference model 1010 of FIG. 10 at a position relative to the in response to detecting that the end user has scanned anchor 1404 using the MR device.

Typically, display of the MR procedure to the end user does not include the spatial UIs used to modify the MR procedure and discussed with respect to FIGS. 4-13. For example, configuration of the MR procedure using the spatial UIs discussed yields an MR step of the MR procedure whereby reference model 1010 is displayed at a configured position relative to anchor 1404 with tooltip 1304. In various embodiments, however, the end user may be granted permission to modify the MR step such as via one or more of the spatial UI interfaces discussed with respect to FIGS. 4-13. While FIGS. 4-13 show configuration of an example MR step in the MR procedure, in various embodiments any number of MR steps are created in a similar way to be displayed to the end user. FIG. 15 is an example of how the MR step configured in FIGS. 4-13 is displayed to an end user using an MR device.

FIG. 15 is a display diagram illustrating an interface 1500 used by the facility in some embodiments to display a step of an MR procedure. Interface 1500 is a visual user interface presented to a user using an XR device. Interface 1500 includes spatial UI 1502 and MR step position indicator 1504. Spatial UI 1502 includes MR step name 1502a, distance indicator 1502b, next button 1502c, and assistance button 1502d. Distance indicator 1502b indicates a distance from a virtual object to be used to perform the MR step. In the example shown in FIG. 15, the drone (not shown in FIG. 15) to be manipulated in the currently displayed MR step is 16.47 meters away. Direction indicator 1504 indicates a direction of the drone.

To complete the MR step shown in FIG. 15, the end user unfolds the drone arms as indicated by spatial UI 1502. In some embodiments, the facility permits the end user to manually move to a next MR step in the MR procedure by touching next button 1502c. In some embodiments, the next MR step in the MR procedure is displayed when the facility detects that the end user has completed the MR step.

FIG. 16 is a display diagram illustrating an interface 1600 used by the facility in some embodiments to display a virtual keyboard object of an MR procedure. Interface 1600 is a visual user interface presented to a user using an XR device and includes spatial UI 1602 and virtual keyboard object 1604. In some embodiments, a user interacts with virtual keyboard 1604 using near touch gestures. In some embodiments, the user interacts with virtual keyboard object 1604 using far touch gestures. In various embodiments, the virtual keyboard object 1604 is used to navigate the MR procedure, provide text input, take notes to be saved with respect to a displayed MR step of the MR procedure, communicate with user support regarding the MR procedure, etc.

Figure 17:
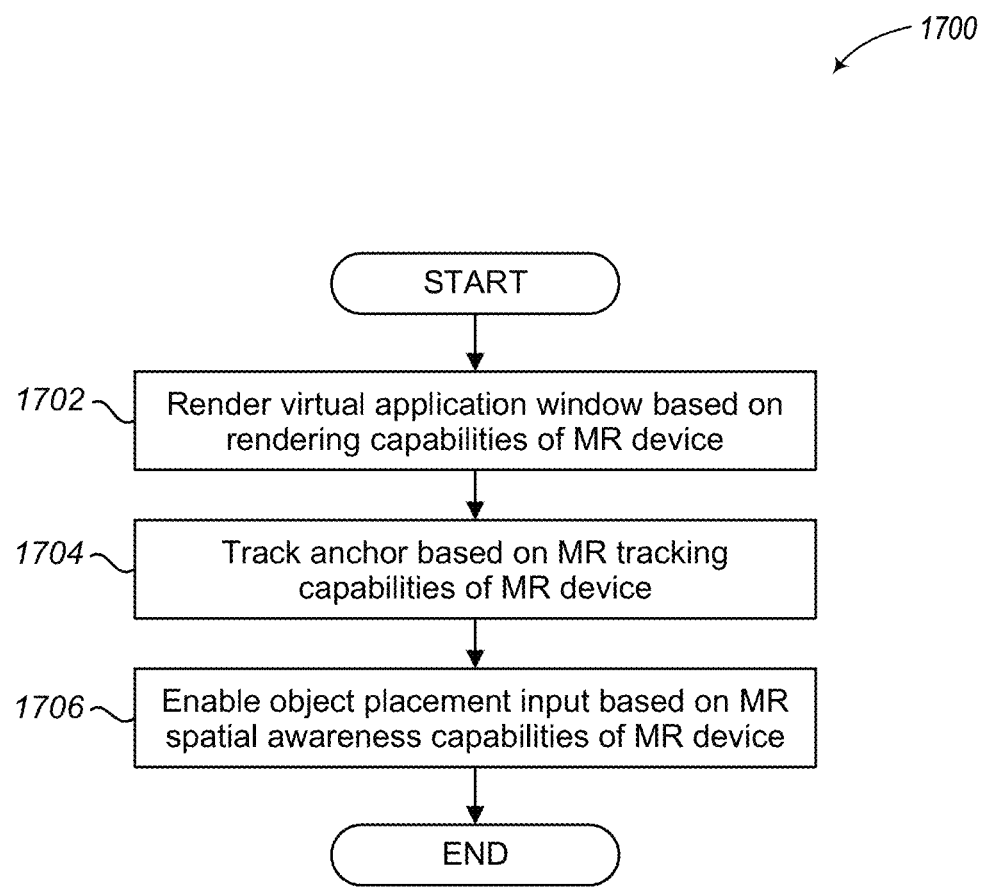
FIG. 17 is flow diagram illustrating a process used by the facility in some embodiments to adapt an MR procedure based on capabilities of an MR device.

FIG. 17 is flow diagram illustrating a process 1700 used by the facility in some embodiments to adapt an MR procedure based on capabilities of an MR device on which the MR procedure is to be executed.

Process 1700 begins, after a start block, at block 1702, where a virtual application window is rendered based on rendering capabilities of an XR device.

In some embodiments wherein the XR device supports passthrough rendering, a background of the virtual application window is rendered transparently, and virtual planes of the virtual application window are rendered transparently. For example, when the XR device is configured to display a real-world environment as a background of the virtual application window, a background of the application window is rendered transparently so the real-world environment is displayed. In another example, when the XR device is not configured to display real-world environment is a background of the virtual application window, a background of the virtual application window is rendered opaquely, such that the real-world environment is not displayed. After block 1702, process 1700 proceeds to block 1704.

At block 1704, an anchor of the MR procedure is tracked based on XR tracking capabilities of the XR device. The MR device may have various tracking capabilities including image tracking, world tracking, object tracking, or geospatial tracking.

Image tracking refers to a capability to track a selected image or marker in a real-world environment. For example, to display a virtual reference model of a drone a QR code sticker on the table may be tracked using image tracking so that the virtual drone reference model is displayed consistently relative to the QR code sticker.

World tracking refers to a capability to track a real-world environment to maintain correspondence between the real-world environment and the MR procedure. For example, to display a virtual reference model of a drone in the MR procedure such that it appears to rest on a real-world surface such as a table, the real-life surface may be tracked using world tracking.

Object tracking refers to a capability to track an object in a real-world environment to maintain correspondence between the object and the MR procedure. For example, an object such as drill may be tracked using object tracking, such that various virtual objects may be displayed relative to the drill in the MR procedure, such as virtual textboxes describing features of the drill.

Geospatial tracking refers to a capability to track a real-world location of the MR device to maintain correspondence between the real-world location and the MR procedure. For example, GPS coordinates of the MR device may be tracked using geospatial tracking such that various virtual objects are displayed when the MR device is at specified GPS coordinates.

In some embodiments wherein the anchor is an image anchor, the MR device tracks the image anchor using image tracking or world tracking.

In some embodiments wherein the anchor is an object anchor, the MR device tracks the object anchor using object tracking or world tracking.

In some embodiments wherein the anchor is a manual anchor, the MR device tracks the manual anchor using world tracking.

In some embodiments wherein the anchor is a location anchor, the MR device tracks to location anchor using geospatial tracking or world tracking.

In various embodiments, the MR device does not have a tracking capability required to track the anchor. In some such embodiments, the MR device obtains manual placement of the anchor. For example, when the anchor is a location anchor but the MR device cannot perform geospatial tracking or world tracking, the anchor is converted to a manual anchor and the MR device obtains manual placement of the manual anchor. In some embodiments, manual placement of a manual anchor includes positioning the manual anchor, rotating the manual anchor, scaling the manual anchor, or any combination thereof. After block 1704, process 1700 proceeds to block 1706.

At block 1706, object placement input is enabled based on spatial awareness capabilities of the MR device. In some embodiments, the MR device supports world meshing, wherein a 3-dimensional mesh is constructed in accordance with a real-world environment. For example, a 3-dimensional mesh corresponding to various surfaces of the real-world environment may be constructed, and virtual objects may be placed relative to the 3-dimensional mesh.

In some embodiments, the MR device supports planar meshing, wherein a 2-dimensional mesh is constructed in accordance with a real-world environment. For example, a plane substantially parallel to the ground may be constructed, and virtual objects may be placed relative to the plane. After block 1706, process 1700 ends at an end block.

The following is a summary of the claims as filed.

A method performed in a computing system may be summarized as including: causing a definition of a mixed reality (MR) procedure to be presented by an editing MR device in a virtual application window; receiving inputs via the editing MR device, the inputs including: first input arranging, in the virtual application window, an anchor for the MR procedure; second input specifying a virtual object to appear in the MR procedure; third input specifying a location, in the virtual application window, of the virtual object relative to the anchor in the MR procedure; and fourth input specifying an MR step in the MR procedure; and interpreting the received inputs as editing actions performed with respect to the MR procedure definition; altering the MR procedure definition in accordance with the editing actions; creating a device-independent representation of the MR procedure based on the altered MR procedure definition; transforming the device-independent representation into a target MR procedure executable by a target MR device; and providing the target MR procedure to the target MR device.

In some embodiments, receiving an input in the inputs includes determining an intersection point of a ray traced from a user's finger and a mesh of the virtual application window.

In some embodiments, receiving the third input includes determining an intersection point of a ray traced from a user's finger and a bounding mesh of the virtual object.

In some embodiments, receiving the fourth input includes receiving instructions for the MR step, the method further including: providing, via the virtual application window, a virtual keyboard; and receiving, using the virtual keyboard, the fourth input specifying the MR step instructions.

In some embodiments, the target MR device is different than the editing MR device.

In some embodiments, the target MR device does not support an anchor type of the anchor, and the method further includes: obtaining, via the target MR device, manual placement of the anchor in the target MR procedure.

In some embodiments, the method further includes: converting the anchor that is incompatible with the target MR device into a second anchor that is compatible with the target MR device.

In some embodiments, the anchor is an image anchor, and the target MR experience is usable for tracking the image anchor using world-based tracking.

In some embodiments, the anchor is an object anchor, and the target MR experience is usable for tracking the object anchor using object tracking.

In some embodiments, the editing MR device is a cell phone.

In some embodiments, the editing MR device is a wearable device.

A system may be summarized as including: one or more memories configured to collectively store computer instructions; and one or more processors configured to collectively execute the stored computer instructions to perform actions, the actions including: causing a definition of a mixed reality (MR) procedure to be presented by an editing MR device in a virtual application window; receiving, via the editing MR device, input specifying an MR step in the MR procedure; interpreting the received input as one or more editing actions performed with respect to the MR procedure definition; altering the MR procedure definition in accordance with the editing actions; creating a device-independent representation of the MR procedure based on the altered MR procedure definition; transforming the device-independent representation into a target MR procedure executable by a target MR device; and providing the target MR procedure to the target MR device.

In some embodiments, receiving the input specifying the MR step includes: determining an intersection point of a ray traced from a user's finger and a mesh displayed in the virtual application window.

In some embodiments, receiving the input specifying the MR step includes: determining an intersection point of a ray traced from a user's finger and a bounding mesh of a virtual object displayed in the virtual application window.

In some embodiments, receiving the input specifying the MR step includes: providing a virtual keyboard object in the virtual application window; and receiving, using the virtual keyboard object, the input specifying the MR step that includes instructional text for the MR step.

An apparatus may be summarized as including: one or more memories configured to collectively store computer instructions; and one or more processors configured to collectively execute the stored computer instructions to perform actions, the actions including: presenting a definition of a mixed reality (MR) procedure in a virtual application window; obtaining input specifying an MR step in the MR procedure; interpreting the input as one or more editing actions performed with respect to the MR procedure definition; altering the MR procedure definition in accordance with the editing actions; and creating a device-independent representation of the MR procedure based on the altered MR procedure definition.

In some embodiments, obtaining the input specifying the MR step includes: determining an intersection point of a ray traced from a user's finger and a mesh displayed in the virtual application window.

In some embodiments, obtaining the input specifying the MR step includes: determining an intersection point of a ray traced from a user's finger and a bounding mesh of a virtual object displayed in the virtual application window.

In some embodiments, obtaining the input specifying the MR step includes: providing a virtual keyboard object in the virtual application window; obtaining, using the virtual keyboard object, the input specifying the MR step that includes instructional text for the MR step.

In some embodiments, creating the device-independent representation of the MR procedure includes replacing functionality of the altered MR procedure definition with functionality of a device-independent representation based on a mapping.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method performed in a computing system, the method comprising:
  causing a definition of a mixed reality (MR) procedure to be presented by an editing MR device in a virtual application window;
  receiving inputs via the editing MR device, the inputs including:
    first input arranging, in the virtual application window, an anchor for the MR procedure;
    second input specifying a virtual object to appear in the MR procedure;
    third input specifying a location, in the virtual application window, of the virtual object relative to the anchor in the MR procedure; and
    fourth input specifying an MR step in the MR procedure;
  interpreting the received inputs as editing actions performed with respect to the MR procedure definition;
  altering the MR procedure definition in accordance with the editing actions;
  creating a device-independent representation of the MR procedure based on the altered MR procedure definition;
  transforming the device-independent representation into a target MR procedure executable by a target MR device, comprising:

determining that the anchor is incompatible with the target MR device based on the target MR device not having a tracking capability to track an anchor type of the anchor; and converting the anchor that is incompatible with the target MR device into a second anchor that is compatible with the target MR device; and providing the target MR procedure to the target MR device.

2. The method of claim 1, wherein receiving an input in the inputs comprises determining an intersection point of a ray traced from a user's finger and a mesh of the virtual application window.

3. The method of claim 1, wherein receiving the third input comprises determining an intersection point of a ray traced from a user's finger and a bounding mesh of the virtual object.

4. The method of claim 1, wherein receiving the fourth input comprises receiving instructions for the MR step, the method further comprising:

providing, via the virtual application window, a virtual keyboard; and receiving, using the virtual keyboard, the fourth input specifying the MR step instructions.

5. The method of claim 1, wherein the target MR device is different than the editing MR device.

6. The method of claim 1, further comprising:

obtaining, via the target MR device, manual placement of the second anchor in the target MR procedure.

7. The method of claim 1, wherein the anchor is an image anchor, and the target MR experience is usable for tracking the image anchor using world-based tracking.

8. The method of claim 1, wherein the anchor is an object anchor, and the target MR experience is usable for tracking the object anchor using object tracking.

9. The method of claim 1, wherein the editing MR device is a cell phone.

10. The method of claim 1, wherein the editing MR device is a wearable device.

11. A system comprising:

one or more memories configured to collectively store computer instructions; and one or more processors configured to collectively execute the stored computer instructions to perform actions, the actions comprising:

causing a definition of a mixed reality (MR) procedure to be presented by an editing MR device in a virtual application window;

receiving, via the editing MR device, input specifying an MR step in the MR procedure;

interpreting the received input as one or more editing actions performed with respect to the MR procedure definition;

altering the MR procedure definition in accordance with the editing actions;

creating a device-independent representation of the MR procedure based on the altered MR procedure definition;

transforming the device-independent representation into a target MR procedure executable by a target MR device, comprising:

determining that an anchor of the MR procedure is incompatible with the target MR device based on the target MR device not having a tracking capability to track an anchor type of the anchor; and converting the anchor that is incompatible with the target MR device into a second anchor that is compatible with the target MR device; and providing the target MR procedure to the target MR device.

12. The system of claim 11, wherein receiving the input specifying the MR step comprises:

determining an intersection point of a ray traced from a user's finger and a mesh displayed in the virtual application window.

13. The system of claim 11, wherein receiving the input specifying the MR step comprises:

determining an intersection point of a ray traced from a user's finger and a bounding mesh of a virtual object displayed in the virtual application window.

14. The system of claim 11, wherein receiving the input specifying the MR step comprises:

providing a virtual keyboard object in the virtual application window; and receiving, using the virtual keyboard object, the input specifying the MR step that includes instructional text for the MR step.

15. The system of claim 11, the actions further comprising:

obtaining, via the target MR device, manual placement of the second anchor in the target MR procedure.

16. An apparatus comprising:

one or more memories configured to collectively store computer instructions; and one or more processors configured to collectively execute the stored computer instructions to perform actions, the actions comprising:

presenting a definition of a mixed reality (MR) procedure in a virtual application window;

obtaining input specifying an MR step in the MR procedure;

interpreting the input as one or more editing actions performed with respect to the MR procedure definition;

altering the MR procedure definition in accordance with the editing actions; and creating a device-independent representation of the MR procedure based on the altered MR procedure definition;

transforming the device-independent representation into a target MR procedure executable by a target MR device, comprising:

determining that an anchor of the MR procedure is incompatible with the target MR device based on the target MR device not having a tracking capability to track an anchor type of the anchor; and converting the anchor that is incompatible with the target MR device into a second anchor that is compatible with the target MR device.

17. The apparatus of claim 16, wherein obtaining the input specifying the MR step comprises:

determining an intersection point of a ray traced from a user's finger and a mesh displayed in the virtual application window.

18. The apparatus of claim 16, wherein obtaining the input specifying the MR step comprises:

determining an intersection point of a ray traced from a user's finger and a bounding mesh of a virtual object displayed in the virtual application window.

19. The apparatus of claim 16, wherein obtaining the input specifying the MR step comprises:

providing a virtual keyboard object in the virtual application window; and obtaining, using the virtual keyboard object, the input specifying the MR step that includes instructional text for the MR step.

20. The apparatus of claim 16, wherein creating the device-independent representation of the MR procedure includes replacing functionality of the altered MR procedure definition with functionality of a device-independent representation based on a mapping.

* * * * *